United States Patent
Banning

(10) Patent No.: US 11,098,209 B2
(45) Date of Patent: Aug. 24, 2021

(54) CYCLOPOLYMERIZABLE COMPOUNDS FOR 3D PRINTING

(71) Applicant: 3D Systems, Inc., Rock Hill, SC (US)

(72) Inventor: Jeffery H. Banning, Hillsboro, OR (US)

(73) Assignee: 3D SYSTEMS, INC., Rock Hill, SC (US)

( * ) Notice: Subject to any disclaimer, the term of this patent is extended or adjusted under 35 U.S.C. 154(b) by 243 days.

(21) Appl. No.: 16/152,787

(22) Filed: Oct. 5, 2018

(65) Prior Publication Data

US 2019/0106584 A1  Apr. 11, 2019

Related U.S. Application Data

(60) Provisional application No. 62/568,619, filed on Oct. 5, 2017.

(51) Int. Cl.

| | | |
|---|---|---|
| *C08F 2/46* | (2006.01) | |
| *C08F 2/50* | (2006.01) | |
| *C08G 61/04* | (2006.01) | |
| *C09D 11/101* | (2014.01) | |
| *C09D 11/38* | (2014.01) | |
| *B33Y 10/00* | (2015.01) | |
| *B33Y 70/00* | (2020.01) | |
| *B29C 64/124* | (2017.01) | |
| *B29C 64/112* | (2017.01) | |
| *C09D 11/106* | (2014.01) | |
| *C09D 11/107* | (2014.01) | |
| *B29C 64/106* | (2017.01) | |
| *B29K 105/00* | (2006.01) | |

(52) U.S. Cl.
CPC .......... *C09D 11/101* (2013.01); *B29C 64/112* (2017.08); *B29C 64/124* (2017.08); *B33Y 10/00* (2014.12); *B33Y 70/00* (2014.12); *C09D 11/106* (2013.01); *C09D 11/107* (2013.01); *C09D 11/38* (2013.01); *B29C 64/106* (2017.08); *B29K 2105/0002* (2013.01)

(58) Field of Classification Search
CPC ....... B33Y 10/00; B33Y 70/00; C09D 11/106; C09D 11/101; C09D 11/38; C09D 11/107; B29C 64/11; B29C 64/124; B29C 64/106; B29K 2105/0002
USPC ....................... 522/6, 189, 184, 71, 1; 520/1
See application file for complete search history.

(56) References Cited

U.S. PATENT DOCUMENTS

| | | | |
|---|---|---|---|
| 2003/0157435 A1* | 8/2003 | Goodby | B29C 41/003 430/283.1 |
| 2012/0296021 A1* | 11/2012 | Greisiger | C08G 18/8108 524/198 |
| 2018/0037758 A1 | 2/2018 | Ishikawa et al. | |

FOREIGN PATENT DOCUMENTS

| | | | |
|---|---|---|---|
| JP | 2017101213 | * | 6/2017 |
| WO | 0140874 | | 6/2001 |
| WO | 0174919 | | 10/2001 |
| WO | 2016143559 | | 9/2016 |

OTHER PUBLICATIONS

Koizuka et al, JP 2017101213 Machine Translation, Jun. 8, 2017 (Year: 2017).*
PCT International Search Report for International Search Authority for PCT/US2018/054516, dated Jan. 30, 2019 (128 pages).
PCT Written Opinion for International Search Authority for PCT/US2018/054516, dated Jan. 30, 2019 (6 pages).

* cited by examiner

*Primary Examiner* — Jessica Whiteley
(74) *Attorney, Agent, or Firm* — J. Clinton Wimbish; Nexsen Pruet PLLC

(57) ABSTRACT

In one aspect, inks for use with a three-dimensional (3D) printing system are described herein. In some embodiments, an ink described herein comprises 10-70 wt. % cyclopolymerizable monomer, based on the total weight of the ink. The cyclopolymerizable monomer comprises a first ethenyl or ethynyl moiety and a second ethenyl or ethynyl moiety. Additionally, the α-carbon of the first ethenyl or ethynyl moiety and the α-carbon of the second ethenyl or ethynyl moiety have a 1,5-, 1,6-, 1,7-, or 1,8-relationship.

14 Claims, 3 Drawing Sheets

CYCLOPOLYMERIZABLE COMPOUNDS FOR 3D PRINTING

CROSS REFERENCE TO RELATED APPLICATIONS

This application claims priority pursuant to 35 U.S.C. § 119 to U.S. Provisional Patent Application No. 62/568,619, filed Oct. 5, 2017, which is hereby incorporated by references in its entirety.

FIELD

The present invention relates to cyclopolymerizable compounds and, in particular, inks comprising such compounds for use with three-dimensional (3D) printing systems.

BACKGROUND

Some commercially available 3D printers, such as the Project™ 3D Printers manufactured by 3D Systems of Rock Hill, S.C., use inks, which are also known as build materials, that are jetted through a print head as a liquid to form various 3D objects, articles, or parts. Other 3D printing systems also use an ink that is jetted through a print head or otherwise dispensed onto a substrate. In some instances, the ink is solid at ambient temperatures and converts to liquid at elevated jetting temperatures. In other instances, the ink is liquid at ambient temperatures. Moreover, in some cases, the ink can be cured following dispensing and/or deposition of the ink onto the substrate.

Other 3D printers form 3D articles from a reservoir, vat, or container of a fluid ink or build material or a powdered ink or build material. In some cases, a binder material or a laser or other source of energy is used to selectively solidify or consolidate layers of the ink or build material in a stepwise fashion to provide the 3D article.

Inks for 3D printing systems can be used to form a variety of articles for a variety of applications, including in a manner described hereinabove. However, there is a very high demand for inks that can form articles having superior mechanical properties. For example, there is a high demand for inks that can form articles with mechanical properties similar to articles formed from thermoplastic materials.

Prior inks for 3D printing systems that contain acrylates can be used to print articles with very good resolution, but often the resulting articles are rigid, brittle, or flexible but easily breakable. The impact resistance of such articles can be especially low compared to some other articles. Therefore, there exists a need for improved acrylate-containing inks for 3D printing that form articles having improved mechanical properties. Particularly, a need exists for acrylate-containing inks that produce articles having mechanical properties more like those exhibited by articles formed from thermoplastic materials.

SUMMARY

In one aspect, inks for use with a 3D printer are described herein, which in some embodiments, may offer one or more advantages over prior acrylate-containing inks. For example, inks described herein can be used to print articles with improved mechanical properties, including improved impact resistance, compared to those printed with prior acrylate-containing inks. In some embodiments, articles printed using inks described herein also have improved tensile modulus, tensile strength, and/or elongation, compared to articles printed using prior acrylate-containing inks. In some cases, articles printed using inks described herein have a combination of both high elongation and also high impact strength, when compared to other compositions. Additionally, in some cases, inks described herein have reduced viscosity compared to prior acrylate-containing inks. As a result, inks described herein can be used in a variety of different 3D printers, such as those based on Stereolithography (SLA), Digital Light Processing (DLP), and Multi-Jet Printing (MJP). Further, due at least in part to their reduced viscosity, inks described herein can also print easily and quickly.

In some embodiments, an ink for use in a 3D printing system described herein comprises 10-70 wt. % cyclopolymerizable monomer, based on the total weight of the ink. The cyclopolymerizable monomer comprises a first ethenyl or ethynyl moiety and a second ethenyl or ethynyl moiety. Additionally, the α-carbon of the first ethenyl or ethynyl moiety and the α-carbon of the second ethenyl or ethynyl moiety have a 1,5-, 1,6-, 1,7-, or 1,8-relationship. In some cases, the cyclopolymerizable monomer has the specific structure of Formula (I):

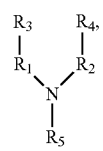

wherein:
- $R_1$ is a hydrocarbon group having 1-4 carbon atoms;
- $R_2$ is a hydrocarbon group having 1-4 carbon atoms;
- the total number of carbon atoms of $R_1$ and $R_2$ does not exceed 5;
- $R_3$ is HC=CH$_2$ or C≡CH;
- $R_4$ is HC=CH$_2$ or C≡CH;
- $R_5$ is

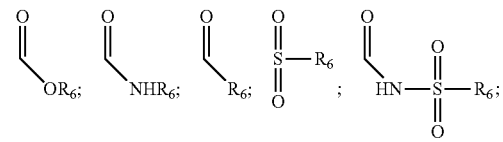

or a polymerizable moiety; and
- $R_6$ is a substituted or unsubstituted hydrocarbon group having 1-30 carbon atoms. The polymerizable moiety, in some instances, comprises a (meth)acrylate moiety.

In other embodiments, the cyclopolymerizable monomer has the structure of Formula (II):

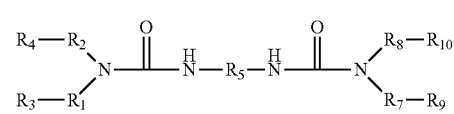

wherein:
- $R_1$ is a hydrocarbon group having 1-4 carbon atoms;
- $R_2$ is a hydrocarbon group having 1-4 carbon atoms;
- the total number of carbon atoms of $R_1$ and $R_2$ does not exceed 5;

$R_3$ is HC=$CH_2$ or C≡CH;
$R_4$ is HC=$CH_2$ or C≡CH;
$R_5$ is a hydrocarbon group having 1-30 carbon atoms or a poly(alkylene glycol) having 2-30 alkylene glycol repeating units;
$R_7$ is a hydrocarbon group having 1-4 carbon atoms;
$R_8$ is a hydrocarbon group having 1-4 carbon atoms;
the total number of carbon atoms of $R_7$ and $R_8$ does not exceed 5;
$R_9$ is HC=$CH_2$ or C≡CH; and
$R_{10}$ is HC=$CH_2$ or C≡CH.

In addition to the above-described cyclopolymerizable monomer, an ink described herein, in some cases, may further comprise 10-60 wt. % of oligomeric curable material and/or up to 80 wt. % of additional monomeric curable material, based on the total weight of the ink. An ink described herein may also comprise at least one photoinitiator, at least one colorant, or both. Additionally, an ink described herein may comprise one or more additives selected from the group consisting of inhibitors and stabilizing agents.

Moreover, an ink described herein, in some instances, has a viscosity of 1600 centipoise (cP) or less at 30° C., or of 500 cP or less at 30° C.

In another aspect, methods of printing a 3D article using any of the foregoing inks are described herein. In some cases, for instance, such a method comprises selectively depositing layers of an ink in a fluid state onto a substrate. Moreover, in some embodiments, the ink is partially cured prior to completion of deposition of all layers of the ink. Partially curing, in some embodiments, primarily comprises polymerizing the first ethenyl or ethynyl moiety, the second ethenyl or ethynyl moiety, and/or a (meth)acrylate moiety of the cyclopolymerizable monomer via alkene, alkyne, and/or (meth)acrylate polymerization. In other instances, partially curing the ink primarily comprises cyclopolymerizing the cyclopolymerizable monomer of the ink.

Additionally, in some cases, following the completion of deposition of all layers of the ink, the ink is post-cured. Post-curing, in some embodiments, primarily comprises polymerizing the first ethenyl or ethynyl moiety, the second ethenyl or ethynyl moiety, and/or a (meth)acrylate moiety of the cyclopolymerizable monomer via alkene, alkyne, and/or (meth)acrylate polymerization. Alternatively, post-curing the ink primarily comprises cyclopolymerizing the cyclopolymerizable monomer.

Further, in some cases, partially curing and post-curing each comprise photocuring, i.e., curing with a light source. Moreover, in some embodiments, a light source used for post-curing has a higher energy than a light source use for partially curing. For example, in some cases, the light source used for post-curing may be a Hg lamp and the light source used for partially curing may be a Xe arc lamp.

In another method of printing a 3D article described herein, the method comprises retaining an ink described herein in a fluid state in a container; and selectively applying energy to the ink in the container to solidify at least a portion of a first fluid layer of the ink, thereby forming a first solidified layer that defines a first cross-section of the article. Such a method can further comprise raising or lowering the first solidified layer to provide a second fluid layer of the ink at a surface of the fluid ink in the container; and selectively applying energy to the ink in the container to solidify at least a portion of the second fluid layer of the ink, thereby forming a second solidified layer that defines a second cross-section of the article, the first cross-section and the second cross-section being bonded to one another in a z-direction. As described further hereinbelow, the foregoing steps may be repeated any desired number of times needed to complete the 3D article.

Moreover, in some cases, selectively applying energy to the ink in the container comprises partially curing the ink. Partially curing the ink may primarily comprise polymerizing the first ethenyl or ethynyl moiety, the second ethenyl or ethynyl moiety, and/or a (meth)acrylate moiety of the cyclopolymerizable monomer via alkene, alkyne, and/or (meth)acrylate polymerization. In other embodiments, partially curing the ink primarily comprises cyclopolymerizing the cyclopolymerizable monomer.

In addition, in some instances, a method described further comprises post-curing the 3D article following its formation. Post-curing the ink, in some cases, primarily comprises polymerizing the first ethenyl or ethynyl moiety, the second ethenyl or ethynyl moiety, and/or a (meth)acrylate moiety (if present) of the cyclopolymerizable monomer via alkene, alkyne, and/or (meth)acrylate polymerization. Alternatively, in some cases, post-curing the ink primarily comprises cyclopolymerizing the cyclopolymerizable monomer of the ink. Further, partially curing and post curing each may comprise photocuring. In some such instances, a light source used for post-curing may have a higher energy than a light source used for partially curing. For example, a Hg lamp may be used for post-curing, and a Xe arc lamp may be used for partially curing.

In still another aspect, printed 3D articles are described herein. In particular, 3D articles formed from an ink and/or using a method described hereinabove are disclosed. Such printed 3D articles, in some cases, have superior mechanical properties or other properties compared to some other 3D articles.

In yet another aspect, cyclopolymerizable compounds are described herein. Such compounds can be used in inks, methods, and articles described hereinabove, or in other applications that are not necessarily limited to 3D printing. In some embodiments, a compound described herein has the structure of Formula (I) or Formula (II) hereinabove. For example, in some cases, a novel compound described herein is

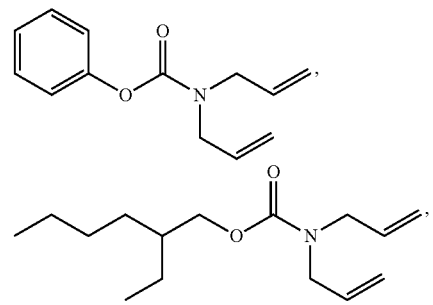

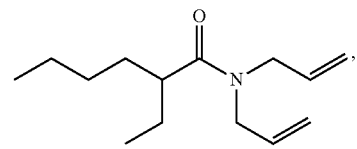

-continued

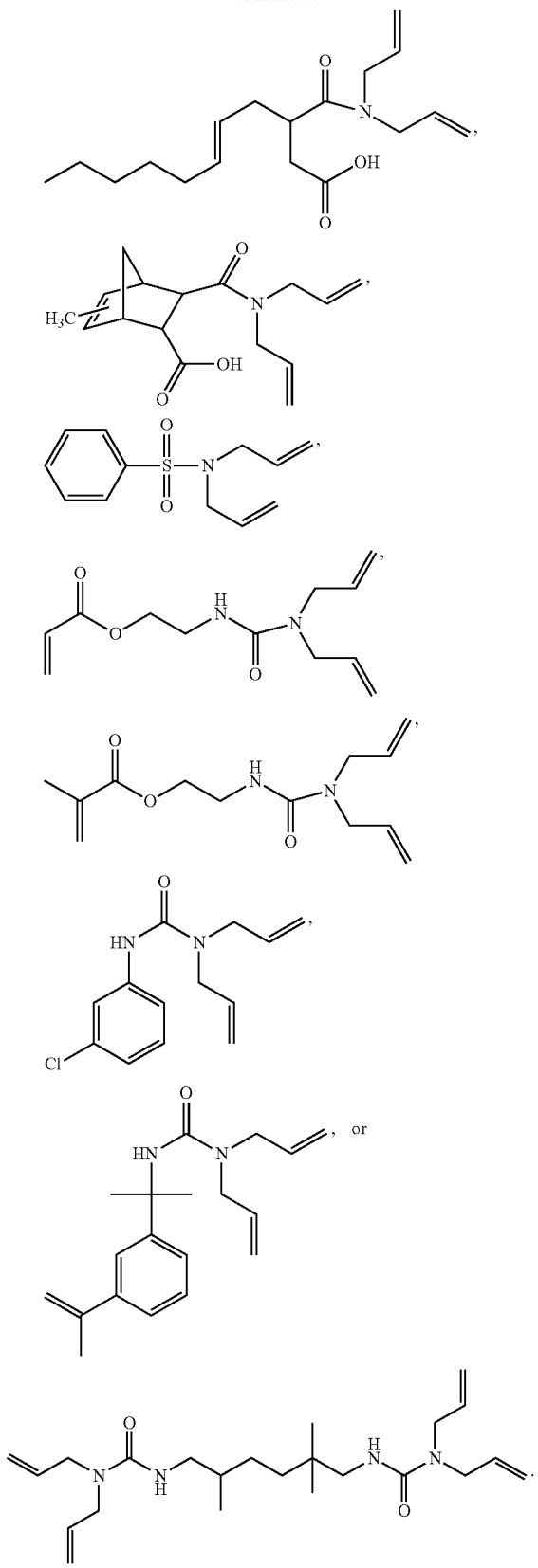

These and other embodiments are described in greater detail in the detailed description which follows.

DETAILED DESCRIPTION

Figure 1:
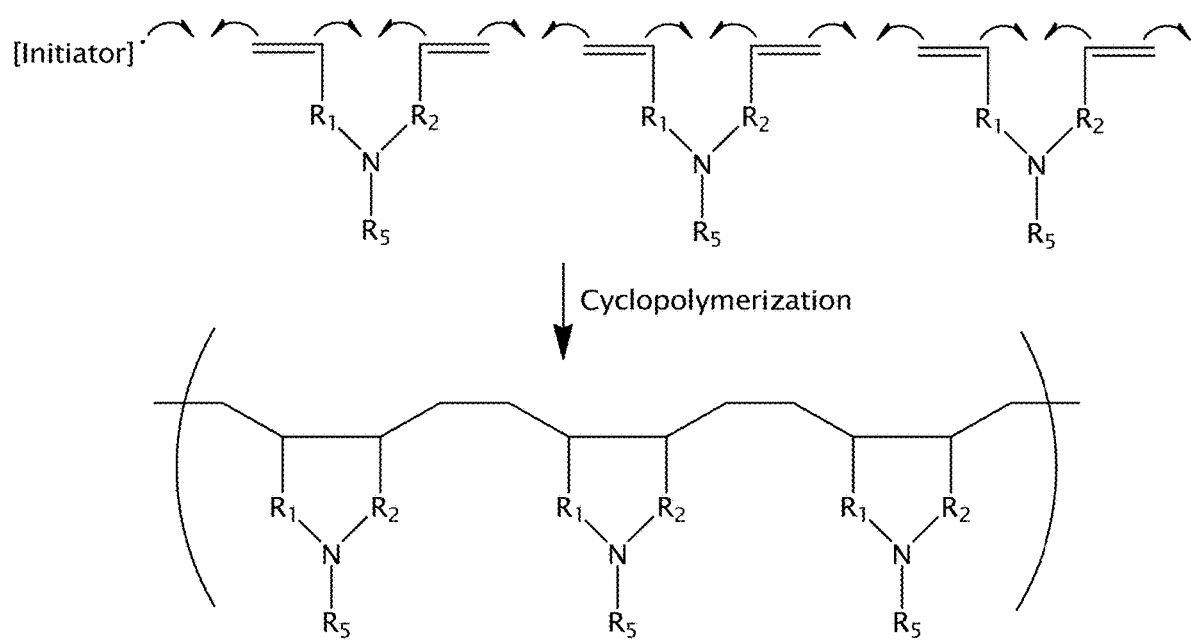
FIG. 1 illustrates cyclopolymerization of a cyclopolymerizable compound or monomer according to some embodiments described herein.

Embodiments described herein can be understood more readily by reference to the following detailed description, figures, and examples. Elements, apparatus and methods described herein, however, are not limited to the specific embodiments presented in the detailed description, figures, and examples. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by stereolithography, selective deposition, jetting, fused deposition modeling, multi-jet modeling, and other additive manufacturing techniques now known in the art or that may be known in the future that use a build material or ink to fabricate three-dimensional objects.

I. Inks for 3D Printing

In one aspect, inks for use with a 3D printer are described herein. In some embodiments, an ink described herein comprises a cyclopolymerizable monomer. Additionally, an ink described herein, in some cases, further comprises one or more of the following: an oligomeric curable material, an additional monomeric curable material, at least one photoinitiator, at least one colorant, and one or more additives selected from the group consisting of inhibitors and stabilizing agents.

Turning now to specific components of inks, inks described herein comprise a cyclopolymerizable monomer. The cyclopolymerizable monomer comprises a first ethenyl or ethynyl moiety and a second ethenyl or ethynyl moiety. Further, the α-carbon of the first ethenyl or ethynyl moiety and the α-carbon of the second ethenyl or ethynyl moiety have a 1,5-, 1,6-, 1,7-, or 1,8-relationship. In some cases, the first and/or second ethenyl moiety can be a vinyl moiety, an allyl moiety, or a (meth)acrylate moiety, where the term "(meth)acrylate" includes an acrylate or methacrylate, or a mixture or combination thereof. The first and/or second ethynyl moiety, in some embodiments, is included in an acetylene or ethyne group or a propargyl group.

Additionally, in some embodiments, a cyclopolymerizable compound or monomer described herein is neutrally charged or negatively charged, or contains no cationic moieties. For instance, in some cases, a cyclopolymerizable compound or monomer described herein does not include a quaternary ammonium moiety, particularly not in a portion of the compound or monomer that does not directly participate in cyclopolymerization or other polymerization of the compound, such as during 3D printing.

Not intending to be bound by theory, it is believed that such a monomer as described above is capable of being cured or polymerized via cyclopoylmerization. For example, the first and second ethenyl or ethynyl moieties of the monomer can be cyclopolymerized to form a 5, 6, 7, or 8-membered ring. Cyclopolymerization of an exemplary cyclopolymerizable monomer described herein is shown in FIG. 1. Without intending to be bound by theory, it is further believed that this cyclopolymerization may be at least partially responsible for the improved mechanical characteristics observed in articles 3D-printed using inks described herein, particularly when compared to other acrylate-containing inks.

Figure 2:
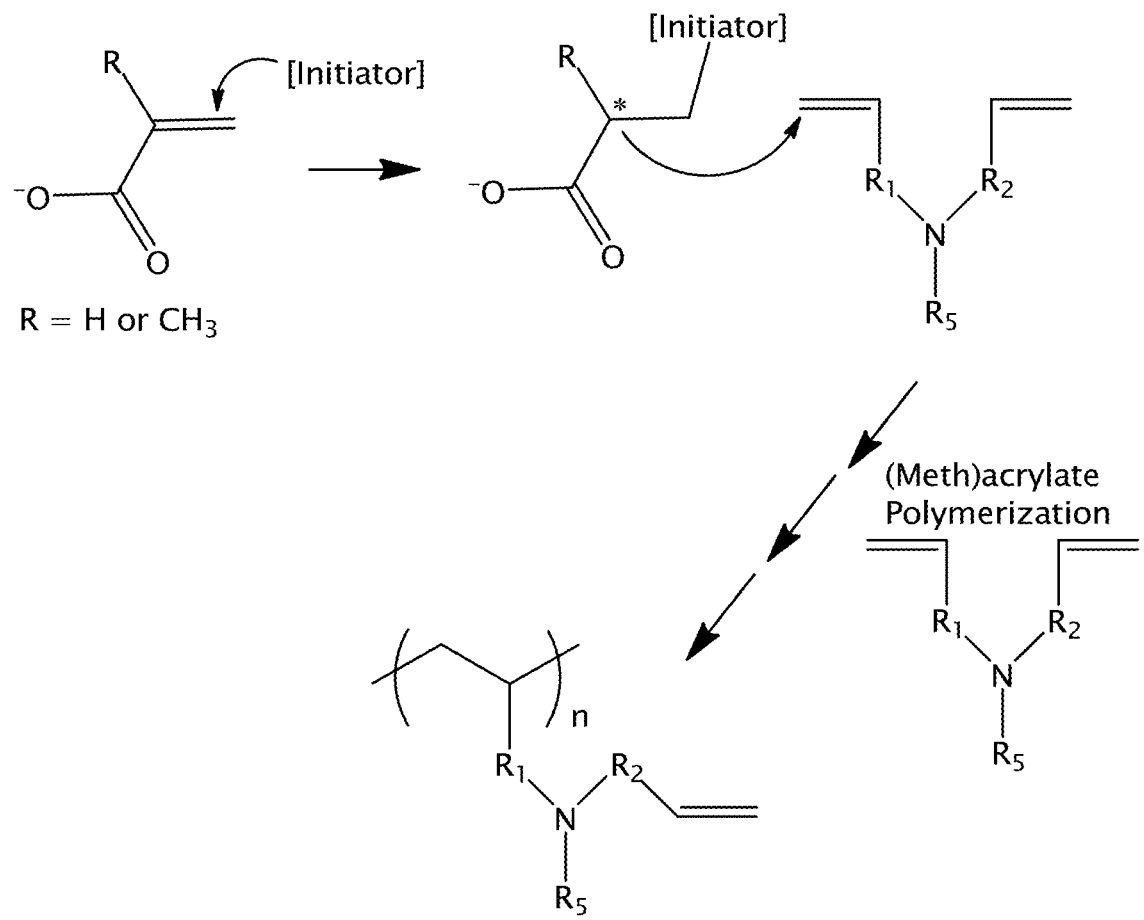
FIG. 2 illustrates (meth)acrylate polymerization of a cyclopolymerizable compound or monomer according to some embodiments described herein.

Moreover, again not intending to be bound by theory, it is further believed that cyclopolymerizable monomers described herein are also capable of being polymerized or cured via (meth)acrylate polymerization or other polymerization of ethyleneically unsaturated moieties. Additionally, this second polymerization or curing pathway or mechanism can be carried out by the first ethenyl or ethynyl moiety, the second ethenyl or ethynyl moiety, or both. This second polymerization or curing pathway is shown in FIG. 2. Such a "second" polymerization or curing pathway may also be carried out, in some cases, by an additional ethyleneically unsaturated moiety of the cyclopolymerizable monomer (if such an additional moiety is present) that differs from the first and second ethenyl or ethynyl moieties.

Without intending to be bound by theory, it is believed that the existence of this second polymerization or curing pathway may further improve the properties of articles formed from an ink comprising a cyclopolymerizable monomer described herein. Still not intending to be bound by theory, it is also believed that the ability of the same moiety or moieties of the cyclopolymerizable compound or monomer (i.e., the first and second ethenyl or ethynyl moieties) to participate in both of the polymerization or curing pathways above can provide additional advantages during a 3D printing process described herein.

Additionally, again without intending to be bound by theory, it is believed that the avoidance or absence of a cationic moiety such as a quaternary ammonium moiety described above, in some embodiments, can improve the compatibility of a cyclopolymerizable compound or monomer described herein with a 3D printing process, such as a process described below in Section II.

Regarding specific suitable cyclopolymerizable monomers, in some embodiments, the cyclopolymerizable monomer of an ink described herein has the structure of Formula (I):

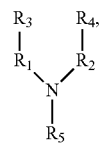

wherein:
R$_1$ is a hydrocarbon group having 1-4 carbon atoms;
R$_2$ is a hydrocarbon group having 1-4 carbon atoms;
the total number of carbon atoms of R$_1$ and R$_2$ does not exceed 5;
R$_3$ is HC=CH$_2$ or C≡CH;
R$_4$ is HC=CH$_2$ or C≡CH; and
R$_5$ is an organic moiety having a molecular weight of 500 or less. In some cases, R$_5$ is an organic moiety having a molecular weight of 300 or less or 200 or less. In some instances, R$_5$ is an organic moiety having a molecular weight of 25-500, 25-400, 25-300, 25-200, 50-500, 50-400, 50-300, or 50-200.

Moreover, in some embodiments, R$_5$ is a polymerizable moiety or contains a polymerizable moiety. Any polymerizable moiety not inconsistent with the objectives of the present disclosure can be included as R$_5$, or in R$_5$. In some cases, for example, the polymerizable moiety is an ethyleneically unsaturated moiety such as a (meth)acrylate moiety, vinyl moiety, or allyl moiety.

In some exemplary embodiments, R$_5$ is an organic moiety having one of the following structures:

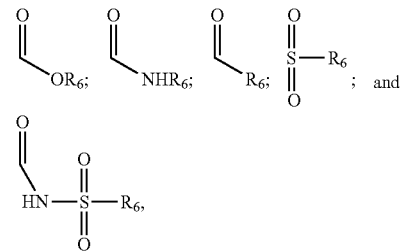

wherein R$_6$ is a substituted or unsubstituted hydrocarbon group having 1-30 carbon atoms. In some cases, R$_6$ includes a polymerizable moiety such as an ethyleneically unsaturated moiety (e.g., a (meth)acrylate, vinyl, or allyl moiety).

In other embodiments, the cyclopolymerizable monomer of an ink described herein has the structure of Formula (II), which may be considered, in some cases, to be a "dimer" of the structure of Formula (I). The structure of Formula (II) is as follows:

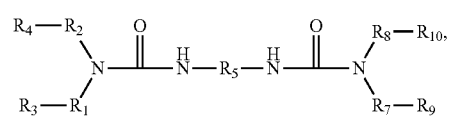

wherein:
R$_1$ is a hydrocarbon group having 1-4 carbon atoms;
R$_2$ is a hydrocarbon group having 1-4 carbon atoms;
the total number of carbon atoms of R$_1$ and R$_2$ does not exceed 5;
R$_3$ is HC=CH$_2$ or C≡CH;

$R_4$ is $HC=CH_2$ or $C\equiv CH$; and
$R_5$ is a hydrocarbon group having 1-30 carbon atoms or a poly(alkylene glycol) having 2-30 alkylene glycol repeating units;
$R_7$ is a hydrocarbon group having 1-4 carbon atoms;
$R_8$ is a hydrocarbon group having 1-4 carbon atoms;
the total number of carbon atoms of $R_7$ and $R_8$ does not exceed 5;
$R_9$ is $HC=CH_2$ or $C\equiv CH$; and
$R_{10}$ is $HC=CH_2$ or $C\equiv CH$.

In some preferred embodiments, $R_5$ in Formula (II) is a poly(alkylene glycol) having 2-30 alkylene glycol repeating units cases. In other instances, $R_5$ in Formula (II) is a substituted or unsubstituted benzene ring or phenyl moiety, such as a tolyl moiety.

Moreover, in some specific embodiments, $R_1$ and $R_2$ in Formula (I), and $R_1$, $R_2$, $R_7$, and $R_8$ in Formula (II), are each, individually, a hydrocarbon group having 1-3 carbon atoms or 1-2 carbon atoms. Additionally, it is to be understood that $R_1$ and $R_2$ (and $R_7$ and $R_8$) may be the same or different. In one preferred embodiment, $R_1$ and $R_2$ (or $R_1$, $R_2$, $R_7$, and $R_8$) are each, individually, linear, saturated hydrocarbon groups having 1 or 2 carbon atoms, and the total number of carbon atoms of $R_1$ and $R_2$ (and/or the total number of carbon atoms of $R_7$ and $R_8$) does not exceed 4.

It is further to be understood that any hydrocarbon group in Formula (I) or Formula (II) above (including as part of $R_5$ or $R_6$) can be branched or linear, saturated or unsaturated, and the hydrocarbon group may contain or be a saturated or unsaturated, substituted or un-substituted hydrocarbon ring.

Additional embodiments of cyclopolymerizable monomers described herein can be found in the specific Examples section hereinbelow.

The above-described cyclopolymerizable monomer can be present in an ink described herein in any amount not inconsistent with the objectives of the present disclosure. In some cases, the cyclopolymerizable monomer, in total, is present in the ink in an amount up to about 70 wt. %, up to about 60 wt. %, up to about 50 wt. %, up to about 40 wt. %, up to about 30 wt. %, up to about 20 wt. %, or up to about 10 wt. %, based on the total weight of the ink. In some instances, an ink described herein comprises about 10-70 wt. % of the cyclopolymerizable monomer, based on the total weight of the ink. In some embodiments, an ink comprises about 10-60 wt. %, 10-50 wt. %, 10-40 wt. %, 10-30 wt. %, 10-20 wt. %, 20-70 wt. %, 20-60 wt. %, 20-50 wt. %, 20-45 wt. %, 20-40 wt. %, 20-35 wt. %, or 20-30 wt. % of the cyclopolymerizable monomer, based on the total weight of the ink.

Turning now to other specific components of inks described herein, inks described herein may further comprise one or more oligomeric curable materials and/or one or more additional monomeric curable materials (where the additional monomeric curable material is "additional" relative to the cyclopolymerizable monomer described above). However, it is to be understood that one or more of such other ink components (i.e., oligomeric curable materials and/or additional monomeric curable materials) are not necessarily present in all ink compositions described herein.

A curable material, for reference purposes herein, comprises a chemical species that includes one or more curable or polymerizable moieties. A "polymerizable moiety," for reference purposes herein, comprises a moiety that can be polymerized or cured to provide a printed 3D article or object. Such polymerizing or curing can be carried out in any manner not inconsistent with the objectives of the present disclosure. In some embodiments, for example, polymerizing or curing comprises irradiating a polymerizable or curable material with electromagnetic radiation having sufficient energy to initiate a polymerization or cross-linking reaction. For instance, in some cases, ultraviolet (UV) radiation can be used. Thus, in instances, a polymerizable moiety comprises a photo-polymerizable or photo-curable moiety, such as a UV-polymerizable moiety. In some embodiments, a curable material described herein is photo-polymerizable or photo-curable at wavelengths ranging from about 300 nm to about 400 nm or from about 320 nm to about 380 nm. Alternatively, in other instances, a curable material is photo-polymerizable at visible wavelengths of the electromagnetic spectrum.

Moreover, a polymerization reaction, in some cases, comprises a free radical polymerization reaction, such as that between points of unsaturation, including points of ethyleneic unsaturation. Other polymerization reactions may also be used. As understood by one of ordinary skill in the art, a polymerization reaction used to polymerize or cure a curable material described herein can comprise a reaction of a plurality of "monomers" or chemical species having one or more functional groups or moieties that can react with one another to form one or more covalent bonds.

One non-limiting example of a polymerizable moiety of a curable material described herein is an ethyleneically unsaturated moiety, such as a vinyl moiety, allyl moiety, or (meth)acrylate moiety, where the term "(meth)acrylate" includes acrylate or methacrylate or a mixture or combination thereof.

"Oligomeric" species, which are contained in the oligomeric curable material described herein, are themselves polymers or oligomers and have a relatively high molecular weight or a relatively high viscosity. These species are also capable of undergoing additional polymerization, such as through one or more points of unsaturation described herein. A population of oligomeric species in the oligomeric curable material described herein can have varying molecular structures and/or formulas throughout the population (such as may be exhibited, for example, by a specified mass of a urethane acrylate having a non-unity molecular weight distribution, or by a specified mass of an ethoxylated polyethylene glycol having a distribution of ethylene glycol units and/or a distribution of ethoxy units within the population). The weight average molecular weight of an oligomeric curable material described herein can generally be in the range from about 400 to 10,000, from about 600 to 10,000, or from about 500 to 7,000.

In contrast to an "oligomeric" species, "monomeric" species, which are contained in the additional monomeric material described herein, are not themselves a polymer or oligomer, and have a relatively low molecular weight or a relatively low viscosity. "Monomeric" species contained in the additional monomeric curable material can have a consistent or well-defined molecular structure and/or formula throughout the population (such as may be exhibited, for instance, by a specified mass of ethoxylated (4) bisphenol A diacrylate or a specific mass of the above-described curable monomer). Additionally, in some embodiments, an additional monomeric curable material as described herein has a viscosity of 500 centipoise (cP) or less at 25° C., when measured according to ASTM D2983, while an "oligomeric" curable material has a viscosity of 1000 cP or more at 25° C., when measured according to ASTM D2983.

One non-limiting example of a polymerizable moiety of the oligomeric curable material or the additional monomeric curable material described herein is an ethylenically unsaturated moiety, such as a vinyl moiety, allyl moiety, or (meth)acrylate moiety, where the term "(meth)acrylate" includes acrylate or methacrylate or a mixture or combination thereof.

Additionally, the oligomeric curable material and the additional monomeric curable material described herein can comprise a monofunctional, difunctional, trifunctional, tetrafunctional, pentafunctional, or higher functional curable species. A "monofunctional" curable species, for reference purposes herein, comprises a chemical species that includes one curable or polymerizable moiety. Similarly, a "difunctional" curable species comprises a chemical species that includes two curable or polymerizable moieties; a "trifunctional" curable species comprises a chemical species that includes three curable or polymerizable moieties; a "tetrafunctional" curable species comprises a chemical species that includes four curable or polymerizable moieties; and a "pentafunctional" curable species comprises a chemical species that includes five curable or polymerizable moieties. Thus, in some embodiments, a monofunctional curable material of an ink described herein comprises a mono(meth)acrylate, a difunctional curable material of an ink described herein comprises a di(meth)acrylate, a trifunctional curable material of an ink described herein comprises a tri(meth)acrylate, a tetrafunctional curable material of an ink described herein comprises a tetra(meth)acrylate, and a pentafunctional curable material of an ink described herein comprises a penta(meth)acrylate. Other monofunctional, difunctional, trifunctional, tetrafunctional, and pentafunctional curable materials may also be used.

Moreover, a monofunctional, difunctional, trifunctional, tetrafunctional, and pentafunctional curable material, in some cases, can comprise a relatively low molecular weight species, i.e., a monomeric species, or a relatively high molecular weight species, i.e., an oligomeric species.

In general, any oligomeric curable material not inconsistent with the objectives of the present disclosure may be used in an ink described herein. In some cases, for instance, an oligomeric curable material comprises a polyester (meth)acrylate oligomer, a urethane (meth)acrylate oligomer, or an epoxy(meth)acrylate oligomer. Further, in some embodiments, an oligomeric curable material described herein comprises an aliphatic polyester urethane acrylate oligomer and/or an acrylate amine oligomeric resin, such as EBECRYL 7100. In some cases, an oligomeric curable material described herein comprises a polypropylene glycol mono (meth)acrylate or polyethylene glycol mono(meth)acrylate. In some embodiments, an oligomeric curable material comprises a monofunctional aliphatic urethane (meth)acrylate. Moreover, in some cases, an oligomeric curable material comprises a diacrylate and/or dimethacrylate ester of an aliphatic, cycloaliphatic or aromatic diol, including polyethylene glycol, ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri(meth)acrylate, or ethoxylated or propoxylated glycerol tri(meth)acrylate.

Moreover, an oligomeric curable material consistent with the objectives of the present disclosure, in some instances, does not include a polymer or oligomer comprising or formed from one or more structural units derived from a cyclopolymerizable monomer as described herein, e.g., a cyclopolymerizable monomer according to Formula (I) or Formula (II). Similarly, in some cases, the oligomeric curable material does not include a polymer or oligomer comprising structural units derived from a cyclopolymerizable monomer as described herein (e.g., a cyclopolymerizable monomer according to Formula (I) or Formula (II)), and at least one monomer selected from the group consisting of (meth)acrylic ester, (meth)acrylamide, unsaturated monocarboxylic acid, and aromatic vinyl and N-substituted maleimide. Instead, in some preferred embodiments, inks described herein contain a cyclopolymerizable monomer as described herein (e.g., a cyclopolymerizable monomer according to Formula (I) or Formula (II)), only as a monomeric curable material prior to curing.

Some non-limiting examples of commercially available oligomeric curable materials useful in some embodiments described herein include the following: alkoxylated tetrahydrofurfuryl acrylate, commercially available from SARTOMER under the trade name SR 611; monofunctional urethane acrylate, commercially available from RAHN USA under the trade name GENOMER 1122; an aliphatic urethane diacrylate, commercially available from ALLNEX under the trade name EBECRYL 8402; a multifunctional acrylate oligomer, commercially available from DYMAX Corporation under the trade name BR-952; and aliphatic polyether urethane acrylate, commercially available from DYMAX Corporation under the trade name BR-371 S. Other commercially available oligomeric curable materials may also be used.

Urethane (meth)acrylates suitable for use in inks described herein, in some cases, can be prepared in a known manner, typically by reacting a hydroxyl-terminated urethane with acrylic acid or methacrylic acid to give the corresponding urethane (meth)acrylate, or by reacting an isocyanate-terminated prepolymer with hydroxyalkyl acrylates or methacrylates to give the urethane (meth)acrylate. Suitable processes are disclosed, inter alia, in EP-A 114 982 and EP-A 133 908. The weight average molecular weight of such (meth)acrylate oligomers, in some cases, can be from about 400 to 10,000 or from about 500 to 7,000. Urethane (meth)acrylates are also commercially available from SARTOMER under the product names CN980, CN981, CN975 and CN2901, or from BOMAR Specialties Co. under the product name BR-741. In some embodiments described herein, a urethane (meth)acrylate oligomer has a viscosity ranging from about 140,000 centipoise (cP) to about 160,000 cP at about 50° C. or from about 125,000 cP to about 175,000 cP at about 50° C. when measured in a manner consistent with ASTM D2983. In some cases, a urethane (meth)acrylate oligomer has a viscosity ranging from about 100,000 cP to about 200,000 cP at about 50° C. or from about 10,000 cP to about 300,000 cP at about 50° C. when measured in a manner consistent with ASTM D2983.

The oligomeric curable material can be present in an ink described herein in any amount not inconsistent with the objectives of the present disclosure (if it is present at all). In some cases, the oligomeric curable material, in total, is present in the ink in an amount up to about 70 wt. %, up to about 60 wt. %, up to about 50 wt. %, up to about 40 wt. %, up to about 30 wt. %, or up to about 20 wt. %, based on the total weight of the ink. In some instances, an ink described herein comprises about 10-70 wt. % of the oligomeric curable material, based on the total weight of the ink. In some embodiments, an ink comprises about 10-60 wt. %, 10-50 wt. %, 10-40 wt. %, 10-30 wt. %, 10-20 wt. %, 15-40 wt. %, 15-30 wt. %, 20-60 wt. %, 20-50 wt. %, 20-40 wt. %, 30-60 wt. %, 30-50 wt. %, or 40-60 wt. % of the oligomeric curable material, based on the total weight of the ink. Alternatively, in other embodiments, an oligomeric curable material is not present in an ink described herein.

In addition, any monomeric curable materials not inconsistent with the objectives of the present disclosure may be used as the additional monomeric curable material described herein. In some cases, the additional monomeric curable material of an ink described herein comprises one or more species of (meth)acrylates, such as one or more monofunctional, difunctional, trifunctional, tetrafunctional (meth) acrylates, and/or pentafunctional (meth)acrylates. In some embodiments, for instance, a monomeric curable material comprises methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth) acrylate, n-octyl (meth)acrylate, n-decyl (meth)acrylate, n-dodecyl (meth)acrylate, 2-hydroxyethyl (meth)acrylate, 2- or 3-hydroxypropyl (meth)acrylate, 2-methoxyethyl (meth) acrylate, 2-ethoxyethyl (meth)acrylate, 2- or 3-ethoxypropyl (meth)acrylate, tetrahydrofurfuryl methacrylate, isobornyl (meth)acrylate, 2-(2-ethoxyethoxy)ethyl acrylate, cyclohexyl methacrylate, 2-phenoxyethyl acrylate, glycidyl acrylate, isodecyl acrylate, 2-phenoxyethyl (meth)acrylate, lauryl methacrylate, or a combination thereof. In some embodiments, a monomeric curable material comprises one or more of allyl acrylate, allyl methacrylate, triethylene glycol di(meth)acrylate, tricyclodecane dimethanol diacrylate, and cyclohexane dimethanol diacrylate. Additionally, in some cases, a monomeric curable material comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, tripropylene glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, or bisphenol S. A monomeric curable material described herein may also comprise 1,1-trimethylolpropane tri(meth)acrylate, pentaerythritol monohydroxy tri(meth) acrylate, dipentaerythritol monohydroxy penta(meth)acrylate, and/or bis(trimethylolpropane) tetra(meth)acrylate. Further, in some cases, a monomeric curable material can comprise an ethoxylated or propoxylated species, such as ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1,1-trimethylolpropanetri (meth)acrylate, or ethoxylated or propoxylated glycerol tri (meth)acrylate.

Additional non-limiting examples of commercially available monomeric curable materials useful as the additional monomeric curable material in some embodiments described herein include the following: isobornyl acrylate (IBOA), commercially available from SARTOMER under the trade name SR 506; isobornyl methacrylate, commercially available from SARTOMER under the trade name SR 423A; triethylene glycol diacrylate, commercially available from SARTOMER under the trade name SR 272; triethylene glycol dimethacrylate, commercially available from SARTOMER under the trade name SR 205; tricyclodecane dimethanol diacrylate, commercially available from SARTOMER under the trade name SR 833S; tris(2-hydroxy ethyl)isocyanurate triacrylate, commercially available from SARTOMER under the trade name SR 368; 2-phenoxyethyl acrylate, commercially available from SARTOMER under the trade name SR 339; ethyoxylated (3 mole) bisphenol A diacrylate, commercially available from SARTOMER under the trade name SR 349; a cyclic monofunctional acrylate, commercially available by RAHN USA Corp. under the trade name GENOMER 1120; and dipentaerythritol pentaacrylate, commercially available from SARTOMER under the trade name SR 399 LV. Other commercially available monomeric curable materials may also be used.

The additional monomeric curable material can be present in an ink described herein in any amount not inconsistent with the objectives of the present disclosure (if it is present at all). In some cases, the monomeric curable material, in total, is present in an amount up to about 80 wt. %, up to about 70 wt. %, up to about 60 wt. %, or up to about 50 wt. %, based on the total weight of the ink. In some cases, an ink described herein comprises about 0-80 wt. % additional monomeric curable material, based on the total weight of the ink. In some embodiments, an ink comprises about 0-75 wt. %, 0-70 wt. %, 0-60 wt. %, 0-50 wt. %, 0-40 wt. %, 0-35 wt. %, 0-30 wt. %, 0-25 wt. %, 0-20 wt. %, 0-15 wt. %, 0-10 wt. %, or 0-5 wt. % additional monomeric curable material, based on the total weight of the ink. Alternatively, in some cases, an additional monomeric curable material is not present in an ink described herein.

Moreover, with respect to oligomeric curable materials and additional monomeric curable materials described above, it is to be understood that these components of the ink can vary in type and/or in quantity without substantially changing desired improvements provided by cyclopolymerizable monomers described herein.

Turning to another component of inks described herein, inks described herein can further comprise at least one photoinitiator. Any photoinitiator not inconsistent with the objectives of the present disclosure may be used. In some cases, a photoinitiator comprises an alpha-cleavage type (unimolecular decomposition process) photoinitiator or a hydrogen abstraction photosensitizer-tertiary amine synergist, operable to absorb light between about 250 nm and about 400 nm or between about 300 nm and about 385 nm, to yield free radical(s). Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In addition, in some instances, photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, such as 2,4,6-trimethylbenzoyldiphenylphosphine oxide (Lucirin TPO), benzophenones, such as benzophenone and 4,4'-bis(N,N'-dimethylamino) benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Photoinitiators can also comprise photoinitiators operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, photoinitiators comprise photoinitiators operable for use with an Ar laser radiation source including benzil ketals, such as benzil dimethyl ketal. In some embodiments, a suitable photoinitiator comprises an α-hydroxyphenyl ketone, benzil dimethyl ketal or 2,4,6-trimethylbenzoyldiphenylphosphine oxide or a mixture thereof.

Another class of photoinitiators that may be included in an ink described herein comprises ionic dye-counter ion compounds capable of absorbing actinic radiation and generating free radicals for polymerization initiation. Some ionic dye-counter ion compounds and their mode of operation are disclosed in EP-A-0 223 587 and U.S. Pat. Nos. 4,751,102; 4,772,530; and 4,772,541.

A photoinitiator can be present in an ink described herein in any amount not inconsistent with the objectives of the present disclosure. In some embodiments, a photoinitiator is present in an ink in an amount of up to about 5 wt. %, based on the total weight of the ink. In some cases, a photoinitiator is present in an amount ranging from about 0.1 wt. % to about 5 wt. %. It is also possible, in some instances, for an ink described herein to include no photoinitiator, where it is understood that the photoinitiator is a photoinitiator of curing of a curable material or monomer described herein, such as an oligomeric curable material, an additional monomeric curable material, or a cyclopolymerizable monomer.

Additionally, in some embodiments, an ink described herein further comprises one or more photosensitizers. In general, such a sensitizer can be added to an ink to increase the effectiveness of one or more photoinitiators that may also be present. In some cases, a sensitizer comprises isopropylthioxanthone (ITX) or 2-chlorothioxanthone (CTX).

A sensitizer can be present in an ink in any amount not inconsistent with the objectives of the present disclosure. In some embodiments, a sensitizer is present in an amount ranging from about 0.1 wt. % to about 2 wt. % or from about 0.5 wt. % to about 1 wt. %, based on the total weight of the ink.

Turning to another component of the ink described herein, inks described herein can also comprise at least one colorant. The colorant of an ink described herein can be a particulate colorant, such as a particulate pigment, or a molecular colorant, such as a molecular dye. Any such particulate or molecular colorant not inconsistent with the objectives of the present disclosure may be used. In some cases, for instance, the colorant of an ink comprises an inorganic pigment, such as $TiO_2$ and/or ZnO. In some embodiments, the colorant of an ink comprises a colorant for use in a RGB, sRGB, CMY, CMYK, L*a*b*, or Pantone® colorization scheme. In some instances, one or more colorants of an ink described herein exhibits a white color. In other cases, a colorant exhibits a black color. Some non-limiting examples of colorants suitable for use in some embodiments described herein include SUN UVDJ107, SUN UVDJ150, SUN UVDJ322, SUN UVDJ350, SUN UVDJ354, RJA D3010-FX-Y150, RJA D3410-FX-Y150, RJA D3410-FX-K, PENN COLOR 9B898, PENN COLOR 9B989, DNS-GKC-103W, and Ob White Dye. Moreover, in some cases, a particulate colorant described herein has an average particle size of less than about 5 μm, or less than about 1 μm. In some instances, a particulate colorant described herein has an average particle size of less than about 500 nm, such as an average particle size of less than about 400 nm, less than about 300 nm, less than about 250 nm, less than about 200 nm, or less than about 150 nm. In some instances, a particulate colorant has an average particle size of about 50-5000 nm, about 50-1000 nm, or about 50-500 nm.

A colorant can be present in an ink described herein in any amount not inconsistent with the objectives of the present disclosure. In some cases, colorant is present in the ink in an amount up to about 2 wt. %, or an amount of about 0.005-2 wt. %, 0.01-2 wt. %, 0.01-1.5 wt. %, 0.01-1 wt. %, 0.01-0.5 wt. %, 0.1-2 wt. %, 0.1-1 wt. %, 0.1-0.5 wt. %, or 0.5-1.5 wt. %, based on the total weight of the ink. It is also possible for an ink described herein to not include a colorant.

Moreover, inks described herein, in some embodiments, further comprise one or more other additives. In some cases, for example, an ink described herein further comprises one or more polymerization inhibitors and/or stabilizing agents. A polymerization inhibitor can be added to an ink to provide additional thermal stability to the composition. Any polymerization inhibitor not inconsistent with the objectives of the present disclosure may be used. Moreover, a polymerization inhibitor can retard or decrease the rate of polymerization, and/or prevent polymerization from occurring for some period of time or "induction time" until the polymerization inhibitor is consumed. Further, in some cases, a polymerization inhibitor described herein is an "addition type" inhibitor. An inhibitor described herein can also be a "chain transfer type" inhibitor. In some instances, a suitable polymerization inhibitor comprises methoxyhydroquinone (MEHQ).

A stabilizing agent, in some embodiments, comprises one or more anti-oxidants. A stabilizing agent can comprise any anti-oxidant not inconsistent with the objectives of the present disclosure. In some cases, suitable anti-oxidants include various aryl compounds, including butylated hydroxytoluene (BHT), which can also be used as a polymerization inhibitor in some embodiments described herein. More generally, a single species may serve as both a stabilizing agent and a polymerization inhibitor. It is also possible, in some cases, to use a plurality of inhibitors and/or stabilizing agents, wherein differing inhibitors and/or stabilizers provide differing effects and/or work synergistically.

A polymerization inhibitor and/or a stabilizing agent can be present in an ink in any amount not inconsistent with the objectives of the present disclosure. In some embodiments, a polymerization inhibitor is present in an amount ranging from about 0.01 wt. % to about 2 wt. % or from about 0.05 wt. % to about 1 wt. %. Similarly, in some cases, a stabilizing agent is present in an ink in an amount ranging from about 0.1 wt. % to about 5 wt. %, from about 0.5 wt. % to about 4 wt. %, or from about 1 wt. % to about 3 wt. %, based on the total weight of the ink. It is also possible for an ink described herein to exclude a polymerization inhibitor and/or a stabilizing agent.

In some embodiments, an ink described herein may contain viscosity modifying agents. Non-limiting examples of viscosity modifying agents include a saturated fatty acid or a combination of saturated fatty acids, or an oil, such as a plant oil. The inks described herein may comprise up to 5 wt. % up to 3 wt. %, up to 1 wt. %, up to 0.5 wt. %, or up to 0.1 wt. % of a viscosity modifying agent not inconsistent with the objectives of the present disclosure. Alternatively, in some instances, a viscosity modifying agent is not present in an ink described herein.

Inks described herein can exhibit a variety of desirable properties. For example, an ink described herein can have any freezing point, melting point, and/or other phase transition temperature not inconsistent with the objectives of the present disclosure. In some cases, an ink has freezing and melting points consistent with temperatures used in some 3D printing systems, including 3D printing systems designed for use with phase changing inks. In some embodiments, the freezing point of an ink is greater than about 40° C. In some instances, for example, an ink has a freezing point centered at a temperature ranging from about 45° C. to about 55° C.

or from about 50° C. to about 80° C. In some cases, an ink has a freezing point below about 40° C. or below about 30° C.

Further, in some embodiments described herein, an ink exhibits a sharp freezing point or other phase transition. In some cases, for instance, an ink freezes over a narrow range of temperatures, such as a range of about 1-10° C., about 1-8° C., or about 1-5° C. In some embodiments, an ink having a sharp freezing point freezes over a temperature range of X±2.5° C., where X is the temperature at which the freezing point is centered (e.g., X=65° C.).

In addition, an ink described herein, in some cases, is fluid at jetting temperatures encountered in some 3D printing systems. Moreover, in some embodiments, an ink solidifies once deposited on a surface during the fabrication of a three-dimensionally printed article or object. Alternatively, in other instances, an ink remains substantially fluid upon deposition on a surface. Solidification of an ink, in some embodiments, occurs through a phase change of the ink or a component of the ink. The phase change can comprise a liquid to solid phase change or a liquid to semi-solid phase change. Further, in some instances, solidification of an ink comprises an increase in viscosity of the ink, such as an increase in viscosity from a low viscosity state to a high viscosity state. Solidification of an ink can also occur due to curing of the ink.

Additionally, in some embodiments, the inks described herein, when non-cured, has a viscosity profile consistent with the requirements and parameters of one or more 3D printing systems, such as an MJP or SLA system. For example, in some cases, an ink described herein has a dynamic viscosity at 30° C. of 1600 centipoise (cP) or less, 1200 cP or less, or 800 cP or less. In a preferred embodiment, an ink described herein has a dynamic viscosity of 500 cP or less at 30° C., when measured according to ASTM standard D2983 (e.g., using a Brookfield Model DV-II+ Viscometer). In some cases, an ink described herein when non-cured exhibits a dynamic viscosity of about 200-1600 cP, about 200-1200 cP, about 200-800 cP, about 200-500 cP, or about 200-400 cP at 30° C., when measured according to ASTM D2983.

Inks described herein can also exhibit a variety of desirable properties, in addition to those described hereinabove, in a cured state. An ink in a "cured" state, as used herein, comprises an ink that includes a curable material or polymerizable component that has been at least partially cured, i.e., at least partially polymerized and/or cross-linked. For instance, in some cases, a cured ink is at least about 70% polymerized or cross-linked or at least about 80% polymerized or cross-linked. In some embodiments, a cured ink is at least about 85%, at least about 90%, at least about 95%, at least about 98%, or at least 99% polymerized or cross-linked. In some instances, a cured ink is between about 80% and about 99% polymerized or cross-linked.

In some cases, an ink described herein, when cured, has an elongation at break of about 10 to 70%, about 10 to 60%, about 15 to 50%, or about 20 to 50%, when measured according to ASTM D638. Further, a cured ink described herein, in some cases, can have a tensile strength of about 40 to 70 MPa about 40 to 60 MPa, or about 45 to 55 MPa when measured according to ASTM D638. Additionally, a cured ink described herein, in some embodiments, can have a tensile modulus of about 1800 to 2100 MPa, about 1900 to 2100 MPa, or about 1950 to 2050 MPa when measured according to ASTM D638. Also, a cured ink described herein can have an impact resistance of 1 to 4 ft·lb/in (Notched), 1 to 3 ft·lb/in (Notched), or 1 to 2 ft·lb/in (Notched) when measured according to ASTM D256. Finally, in some cases, a cured ink described herein has a flexural modulus of 2000 to 2500 MPa, 2100 to 2400 MPa, or 2100 to 2200 MPa when measured according to ASTM D790.

Moreover, in some cases, an ink described herein, when cured, can exhibit a plurality of the foregoing properties. For example, in some embodiments, an ink when cured has a tensile strength of about 40-70 MPa when measured according to ASTM D638; an impact resistance of 1 to 4 ft·lb/in (Notched), when measured according to ASTM D256; and an elongation at break of about 10-70% when measured according to ASTM D638. In some instances, an ink when cured has an impact resistance of 40-120 J/m or 50-115 J/m, and also an elongation at break of 40-60% or 40-50%, when measured as described herein.

It is to be understood that, in some instances, various components of inks described herein (such as the oligomeric curable material, the additional monomeric curable material, the photoinitiator, the photosensitizer, the colorant, the polymerization inhibitor, the stabilizing agent, or the viscosity modifying agent) can vary in type and/or in quantity without substantially changing desirable properties of inks described herein. For example, in some instances, changes in the specific type and/or quantity of various components of the ink (that are within the scope of the disclosed types and quantities) affect desired properties of the ink, as described above, by 5% or less, 4% or less, 3% or less, 2% or less, or 1% or less. Thus, as described in the Examples provided below, in some instances, the type and quantity of the cyclopolymerizable monomer and/or other components of the ink can be varied as desired from ink to ink without departing from an ink composition exhibiting any one or more of the desirable properties as described herein.

Inks described herein can be produced in any manner not inconsistent with the objectives of the present disclosure. In some embodiments, for instance, a method for the preparation of an ink described herein comprises the steps of mixing the components of the ink, melting the mixture, and filtering the molten mixture. Melting the mixture, in some cases, is carried out at a temperature of about 75° C. or in a range from about 75° C. to about 85° C. In some embodiments, an ink described herein is produced by placing all components of the ink in a reaction vessel and heating the resulting mixture to a temperature ranging from about 75° C. to about 85° C. with stirring. The heating and stirring are continued until the mixture attains a substantially homogenized molten state. In general, the molten mixture can be filtered while in a flowable state to remove any large undesirable particles that may interfere with jetting or extrusion or other printing process. The filtered mixture can then be cooled to ambient temperatures and stored until ready for use in a 3D printing system.

II. Methods of Printing a 3D Article

In another aspect, methods of printing a 3D article or object are described herein. Methods of printing a 3D article or object described herein can include forming the 3D article from a plurality of layers of an ink described herein in a layer-by-layer manner. Any ink described hereinabove in Section I may be used. For example, in some cases, the ink comprises 10-70 wt. % or 20-40 wt. % of a cyclopolymerizable monomer described in Section I above, based on the total weight of the ink. Additionally, in some embodiments, the ink has a dynamic viscosity of 1,600 cP or less or 500 cP or less at 30° C. Further, the layers of an ink can be deposited according to an image of the 3D article in a computer readable format. In some embodiments, the ink is deposited according to preselected computer aided design (CAD) parameters. Moreover, in some cases, one or more layers of an ink described herein has a thickness of about 10 µm to about 100 µm, about 10 µm to about 80 µm, about 10 µm to about 50 µm, about 20 µm to about 100 µm, about 20 µm to about 80 µm, or about 20 µm to about 40 µm. Other thicknesses are also possible.

Additionally, it is to be understood that methods of printing a 3D article described herein can include, for example, MJP or SLA 3D printing methods. For example, in some instances, a MJP method of printing a 3D article comprises selectively depositing layers of an ink described herein in a fluid state onto a substrate, such as a build pad of a 3D printing system. In addition, in some embodiments, a method described herein further comprises supporting at least one of the layers of the ink with a support material. Any support material not inconsistent with the objectives of the present disclosure may be used.

A method described herein can also comprise curing the layers of the ink. For example, in some instances, a method of printing a 3D article described herein further comprises subjecting the ink to electromagnetic radiation of sufficient wavelength and intensity to cure the ink, where curing can comprise polymerizing one or more polymerizable moieties or functional groups of one or more components of the ink. In some cases, a layer of deposited ink is cured prior to the deposition of another or adjacent layer of ink. Additionally, curing one or more layers of deposited ink, in some embodiments, is carried out by exposing the one or more layers to electromagnetic radiation, such as UV light, visible light, or infrared light.

Further details regarding various methods, including "material deposition" methods (such as MJP) or "vat polymerization" methods (such as SLA), are provided below.

A. Material Deposition Methods

In a material deposition method, one or more layers of an ink described herein are selectively deposited onto a substrate and cured. Curing of the ink may occur after selective deposition of one layer, each layer, several layers, or all layers of the ink.

In some instances, an ink described herein is selectively deposited in a fluid state onto a substrate, such as a build pad of a 3D printing system. Selective deposition may include, for example, depositing the ink according to preselected CAD parameters. For example, in some embodiments, a CAD file drawing corresponding to a desired 3D article to be printed is generated and sliced into a sufficient number of horizontal slices. Then, the ink is selectively deposited, layer by layer, according to the horizontal slices of the CAD file drawing to print the desired 3D article. A "sufficient" number of horizontal slices is the number necessary for successful printing of the desired 3D article, e.g., to produce it accurately and precisely.

Further, in some embodiments, a preselected amount of ink described herein is heated to the appropriate temperature and jetted through a print head or a plurality of print heads of a suitable inkjet printer to form a layer on a print pad in a print chamber. In some cases, each layer of ink is deposited according to preselected CAD parameters. A suitable print head to deposit the ink, in some embodiments, is a piezoelectric print head. Additional suitable print heads for the deposition of ink and support material described herein are commercially available from a variety of ink jet printing apparatus manufacturers. For example, Xerox, Hewlett Packard, or Ricoh print heads may be used in some instances.

Additionally, in some embodiments, an ink described herein remains substantially fluid upon deposition. Alternatively, in other instances, the ink exhibits a phase change upon deposition and/or solidifies upon deposition. Moreover, in some cases, the temperature of the printing environment can be controlled so that the jetted droplets of ink solidify on contact with the receiving surface. In other embodiments, the jetted droplets of ink do not solidify on contact with the receiving surface, remaining in a substantially fluid state. Additionally, in some instances, after each layer is deposited, the deposited material is planarized and cured with electromagnetic (e.g., UV, visible or infrared light) radiation prior to the deposition of the next layer. Optionally, several layers can be deposited before planarization and curing, or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some cases, the wiper device comprises a roller and a wiper that removes excess material from the roller. Further, in some instances, the wiper device is heated. It should be noted that the consistency of the jetted ink described herein prior to curing, in some embodiments, should desirably be sufficient to retain its shape and not be subject to excessive viscous drag from the planarizer.

Moreover, a support material, when used, can be deposited in a manner consistent with that described hereinabove for the ink. The support material, for example, can be deposited according to the preselected CAD parameters such that the support material is adjacent or continuous with one or more layers of the ink. Jetted droplets of the support material, in some embodiments, solidify or freeze on contact with the receiving surface. In some cases, the deposited support material is also subjected to planarization, curing, or planarization and curing. Any support material not inconsistent with the objectives of the present disclosure may be used.

Layered deposition of the ink and support material can be repeated until the 3D article has been formed. In some embodiments, a method of printing a 3D article further comprises removing the support material from the ink.

Curing of the ink may occur after selective deposition of one layer of ink, of each layer of ink, of several layers of ink, or of all layers of the ink necessary to print the desired 3D article. In some embodiments, a partial curing of the deposited ink is performed after selective deposition of one layer of ink, each layer of ink, several layers of ink, or all layers of the ink necessary to print the desired 3D article. A "partially cured" ink, for reference purposes herein, is one that can undergo further curing. For example, a partially cured ink is up to about 30% polymerized or cross-linked or up to about 50% polymerized or cross-linked. In some embodiments, a partially cured ink is up to about 60%, up to about 70%, up to about 80%, up to about 90%, or up to about 95% polymerized or cross-linked.

In some embodiments, partial curing of the deposited ink can include irradiating the ink with an electromagnetic radiation source or photocuring the ink. Any electromagnetic radiation source not inconsistent with the objectives of the present disclosure may be used, e.g., an electromagnetic radiation source that emits UV, visible or infrared light. For example, in some embodiments, the electromagnetic radiation source can be one that emits light having a wavelength from about 300 nm to about 900 nm, e.g., a Xe arc lamp.

Moreover, in some embodiments, partial curing of an ink described herein includes polymerizing the first ethenyl or ethynyl moiety, the second ethenyl or ethynyl moiety, and/or a (meth)acrylate moiety of the cyclopolymerizable monomer via alkene, alkyne, and/or (meth)acrylate polymerization. In some cases, partial curing primarily includes such (meth)acrylate polymerization. For example, in some instances, more than 50%, more than 60%, or more than 70% of the polymerization occurs via (meth)acrylate polymerization, rather than via some other polymerization route, e.g., cyclopolymerization of the first and second ethenyl or ethynyl moieties of the ink. During partial curing, which is performed during the build of a desired 3D article, some or none of the polymerization may occur via a route other than a (meth)acrylate polymerization route. Alternatively, in other instances, partially curing the ink comprises cyclopolymerizing the cyclopolymerizable monomer. In some cases, partially curing the ink primarily comprises such cyclopolymerization of the cyclopolymerizable monomer.

Further, in some embodiments, a post-curing is performed after partially curing is performed. For example, in some cases, post-curing is carried out after selectively depositing all layers of the ink necessary to form a desired 3D article, after partially curing all layers of the ink, or after both of the foregoing steps have been performed. Moreover, in some embodiments, post-curing comprises photocuring. Any electromagnetic radiation source not inconsistent with the objectives of the present disclosure may be used for a post-curing step described herein. For example, in some embodiments, the electromagnetic radiation source can be a light source that has a higher energy, a lower energy, or the same energy as the electromagnetic radiation source used for partial curing. In some cases wherein the electromagnetic radiation source used for post-curing has a higher energy (i.e., a shorter wavelength) than that used for partial curing, a Xe arc lamp can be used for partial curing and a Hg lamp can be used for post-curing.

Additionally, in some instances, post-curing of deposited layers of an ink described herein includes cyclopolymerizing the first ethenyl or ethynyl moiety and the second ethenyl or ethynyl moiety of the cyclopolymerizable monomer of the ink. In some cases, post-curing primarily includes such cyclopolymerization. For example, in some embodiments, more than 50%, more than 60%, or more than 70% of the polymerization, during post-curing, occurs via cyclopolymerization rather than by some other route, e.g., via (meth)acrylate polymerization. During post-curing, some or none of the polymerization may occur via a route other than cyclopolymerization described herein. Alternatively, in other instances, post-curing includes (meth)acrylate polymerization, such as that described above for the partially curing step. In some embodiments, post-curing may even include such (meth)acrylate polymerization as the primary polymerization or curing of the post-curing step.

Additionally, after post-curing, in some cases, the deposited layers of ink are at least about 80% polymerized or cross-linked or at least about 85% polymerized or cross-linked. In some embodiments, the deposited layers of ink are at least about 90%, at least about 95%, at least about 98%, or at least about 99% polymerized or cross-linked. In some instances, the deposited layers of ink are bout 80-100%, about 80-99%, about 80-95%, about 85-100%, about 85-99%, about 85-95%, about 90-100%, or about 90-99% polymerized or cross-linked.

B. Vat Polymerization Methods

It is also possible to form a 3D article from an ink described herein using a vat polymerization method, such as an SLA method. Thus, in some cases, a method of printing a 3D article described herein comprises retaining an ink described herein in a fluid state in a container and selectively applying energy to the ink in the container to solidify at least a portion of a fluid layer of the ink, thereby forming a solidified layer that defines a cross-section of the 3D article. Additionally, a method described herein can further comprise raising or lowering the solidified layer of ink to provide a new or second fluid layer of unsolidified ink at the surface of the fluid ink in the container, followed by again selectively applying energy to the ink in the container to solidify at least a portion of the new or second fluid layer of the ink to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying the ink. Moreover, selectively applying energy to the ink in the container can comprise applying electromagnetic radiation having a sufficient energy to cure the ink. In some instances, the electromagnetic radiation has an average wavelength of 300-900 nm, and in other embodiments the electromagnetic radiation has an average wavelength that is less than 300 nm. In some cases, the curing radiation is provided by a computer controlled laser beam. In addition, in some cases, raising or lowering a solidified layer of ink is carried out using an elevator platform disposed in the container of fluid ink. A method described herein can also comprise planarizing a new layer of fluid ink provided by raising or lowering an elevator platform. Such planarization can be carried out, in some cases, by a wiper or roller.

It is further to be understood that the foregoing process can be repeated a desired number of times to provide the 3D article. For example, in some cases, this process can be repeated "n" number of times, wherein n can be up to about 100,000, up to about 50,000, up to about 10,000, up to about 5000, up to about 1000, or up to about 500. Thus, in some embodiments, a method of printing a 3D article described herein can comprise selectively applying energy to an ink in a container to solidify at least a portion of an nth fluid layer of the ink, thereby forming an nth solidified layer that defines an nth cross-section of the 3D article, raising or lowering the nth solidified layer of ink to provide an (n+1)th layer of unsolidified ink at the surface of the fluid ink in the container, selectively applying energy to the (n+1)th layer of ink in the container to solidify at least a portion of the (n+1)th layer of the ink to form an (n+1)th solidified layer that defines an (n+1)th cross-section of the 3D article, raising or lowering the (n+1)th solidified layer of ink to provide an (n+2)th layer of unsolidified ink at the surface of the fluid ink in the container, and continuing to repeat the foregoing steps to form the 3D article. Further, it is to be understood that one or more steps of a method described herein, such as a step of selectively applying energy to a layer of ink, can be carried out according to an image of the 3D article in a computer-readable format. General methods of 3D printing using stereolithography are further described, inter alia, in U.S. Pat. Nos. 5,904,889 and 6,558,606.

Performing a printing process described above can provide a printed 3D article from an ink described herein that has a high feature resolution. The "feature resolution" of an article, for reference purposes herein, can be the smallest controllable physical feature size of the article. The feature resolution of an article can be described in terms of a unit of distance such as microns (μm), or in terms of dots per inch (dpi). As understood by one of ordinary skill in the art, a higher feature resolution corresponds to a higher dpi value but a lower distance value in μm. In some cases, an article formed by depositing or solidifying an ink described herein can have a feature resolution of about 500 μm or less, about 200 μm or less, about 100 μm or less, or about 50 μm or less, including at elevated temperatures. In some embodiments, an article has a feature resolution between about 50 μm and about 500 μm, between about 50 μm and about 200 μm, between about 50 μm and about 100 μm, or between about 100 μm and about 200 μm. Correspondingly, in some instances, an article described herein has a feature resolution of at least about 100 dpi, at least about 200 dpi, at least about 250 dpi, at least about 400 dpi, or at least about 500 dpi. In some cases, the feature resolution of an article is between about 100 dpi and about 600 dpi, between about 100 dpi and about 250 dpi, or between about 200 dpi and about 600 dpi.

In a vat polymerization method such as described above, the ink may be partially cured as described in Section IIA above. For example, in some embodiments, selectively applying energy to the ink in the container to solidify at least a portion of a fluid layer of the ink may include partially curing at least a portion of a fluid layer of the ink. In other embodiments, partial curing of at least a portion of a fluid layer of the ink may occur after a first layer of the ink is provided and solidified, before or after a second layer of the ink is provided or solidified, or before or after one, several, or all subsequent layers of the ink are provided or solidified.

Additionally, in some embodiments of a vat polymerization method described herein, after partial curing or after the desired 3D article is formed, post-curing as described in Section IIA above may be performed. The desired 3D article may be, for example, an article that corresponds to the design in a CAD file.

III. Printed 3D Articles

In another aspect, printed 3D articles are described herein. In some embodiments, a printed 3D article is formed from an ink described herein. Any ink described hereinabove in Section I may be used. For example, in some cases, the ink comprises 10-70 or 20-40 wt. % of a cyclopolymerizable monomer as described in Section I above, based on the total weight of the ink. Further, in some embodiments, the ink has a dynamic viscosity, prior to curing, of 1,600 cP or less or 500 cP or less at 30° C. Moreover, in some cases, a printed 3D article described herein, when cured (e.g., when post-cured), can exhibit mechanical properties similar to injection-molded thermoplastic articles. For example, such a printed 3D article can exhibit, in some cases, an elongation at break of about 10 to 70%, about 10 to 60%, about 15 to 50%, or about 20 to 50%, when measured according to ASTM D638. Further, a printed 3D article described herein, in some cases, can have a tensile strength of about 40 to 70 MPa about 40 to 60 MPa, or about 45 to 55 MPa when measured according to ASTM D638. Additionally, a printed 3D article described herein, in some embodiments, can have a tensile modulus of about 1800 to 2100 MPa, about 1900 to 2100 MPa, or about 1950 to 2050 MPa when measured according to ASTM D638. Notably, a printed 3D article described herein may have an impact resistance (Notched) of 1 to 4 ft·lb/in (Notched), 1 to 3 ft·lb/in (Notched), or 1 to 2 ft·lb/in (Notched) when measured according to ASTM D256. Finally, a printed 3D article described herein may have a flexual modulus of 2000 to 2500 MPa, 2100 to 2400 MPa, or 2100 to 2200 MPa when measured according to ASTM D790.

IV. Cyclopolymerizable Compounds

In another aspect, cyclopolymerizable compounds are described herein. Such compounds can be used as monomers in inks for 3D printing, as described in Sections I, II, and III above. However, it is further to be understood that novel cyclopolymerizable compounds described herein may also be used for applications other than 3D printing applications. For instances, in some embodiments, a cyclopolymerizable compound described herein can be used to form a curable coating such as a UV-curable coating.

In some cases, a cyclopolymerizable compound described herein has the structure of Formula (I) from Section I hereinabove:

For example, in some embodiments, a cyclopolymerizable compound described herein has the structure of Formula (I), wherein $R_5$ is:

wherein $R_6$ is as defined above.

Exemplary compounds of this types include the following:

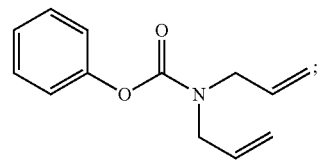

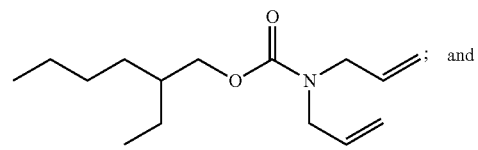

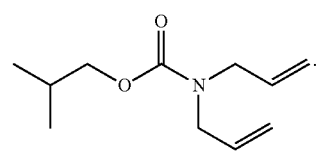

In other instances, a cyclopolymerizable compound described herein has the structure of Formula (I), wherein $R_5$ is:

Non-limiting examples of compounds of this type include the following:

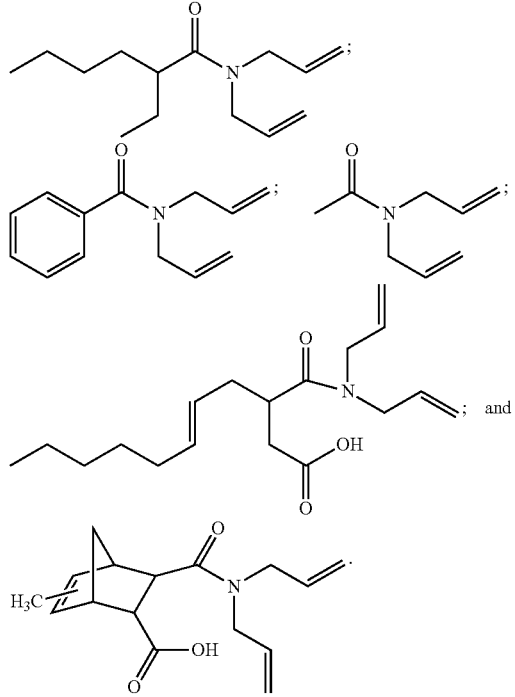

In still other cases, a cyclopolymerizable compound described herein has the structure of Formula (I), wherein $R_5$ is:

Exemplary compounds of this type include

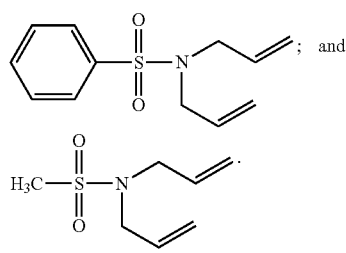

In other cases, a compound described herein has the structure of Formula (I), wherein $R_5$ is:

In some embodiments, such a compound is

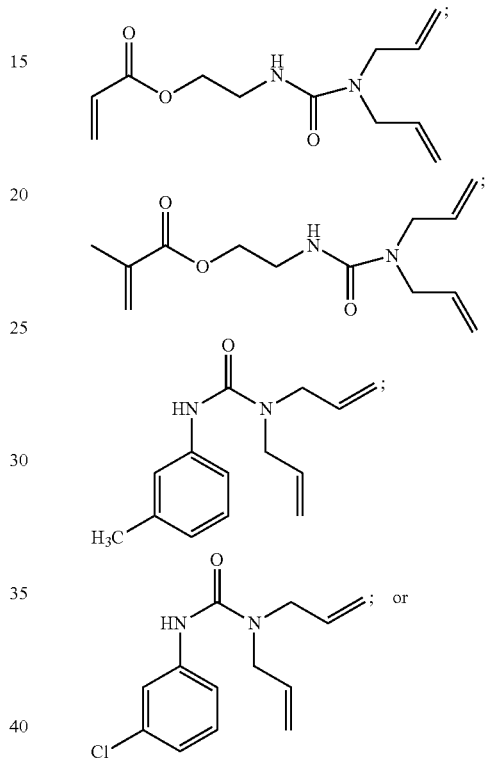

In still other cases, a cyclopolymerizable compound described herein has the structure of Formula (II) from Section I hereinabove:

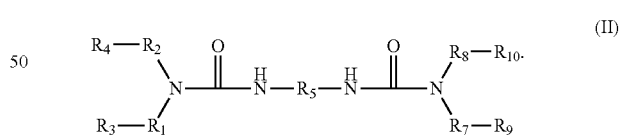

(II)

In some such instances, for example, the compound is

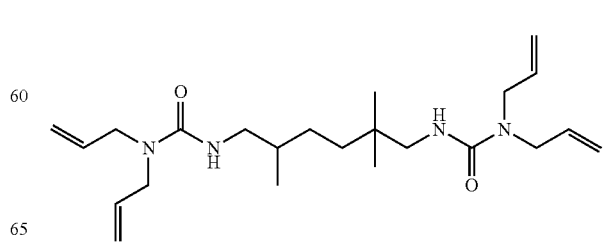

Additional embodiments of cyclopolymerizable compounds described herein are provided in the specific Examples hereinbelow. It is to be understood that further embodiments of cyclopolymerizable compounds, which may not be specifically described below, can be prepared in a manner analogous to the synthetic protocols of the Examples.

Some embodiments of inks for 3D printing are also further illustrated in the following non-limiting Examples.

Example 1

Cyclopolymerizable Compound

A cyclopolymerizable compound having the following structure was prepared as described below.

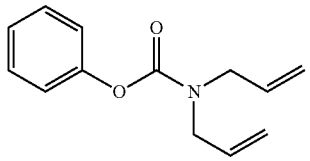 [SMILES: C=CCN(CC=C)C(=O)Oc1ccccc1]

To a 1 liter vessel with a large TEFLON® coated magnet are added 46.7 grams of phenol chloroformate (MW 156.5) and 100 grams of tetrahydrofuran (THF). The vessel is then placed in a large crystallizing dish with ice/water/salt and stirring is begun to cool the mixture to about 0° C. To a different 400 mL beaker are added 31.0 grams of triethyl amine (TEA) (MW=101), 100 grams of THF, and 28.9 grams of diallylamine (DAA) (MW=97). This mixture is stirred with a stir rod until a homogeneous composition is obtained. The mixture of TEA/DAA/THF is slowly pipetted dropwise over about 1 hour to the cooled phenol chloroformate/THF. A white precipitate forms almost instantly, sometimes violently reacting during the initial 50 mL addition of TEA/DAA/THF. If the contents of the reaction mixture in the 1 liter vessel get too thick for the magnet to stir, additional increments (of about 25 mL) of THF are added to thin the mixture and allow stirring to continue. If the contents still get too thick, the 1 liter vessel is manually stirred with a large glass stir rod until all the TEA/DAA/THF has been added. The reaction mixture is allowed to stir, coming to room temperature, overnight.

The next day, a 2 liter vacuum flask equipped with a 400 mL Buchner funnel are set up. A 110 mm Whatman 41 filter is added to the funnel and wetted with acetone and the contents of the 1 liter vessel (containing the product with the TEA-HCl salt in THF) is poured through the Buchner funnel, with vacuum on. The TEA-HCl salt is collected on the filter and the filtrate, containing the product in THF, is collected in the vacuum flask.

A 60 mL disposable syringe is fitted with a 1 μm glass microfilter, with a plug of glass wool added to the bottom, 0.5 inches of sand and about 35 mL of silica gel added. This is placed on a clean 2 L vacuum flask with adaptor. About 35 mL of acetone is added and allowed to wet the silica gel. The product mixture is then slowly added to the syringe and the vacuum introduced. The 1 liter of the product/salt/THF is quickly poured into syringe and filtered over the course of about 5 minutes. The filtrate, containing the product and THF/acetone, is then added to a 2 liter clean and dry beaker and allowed to evaporate, assisted by a gentle nitrogen flow overnight. The product is added to a pre-weighed jar and capped. In this manner, 59.9 g of product was obtained, resulting in a 92.4% yield. A Fourier transform infrared (FTIR) spectrum was obtained to qualitatively verify the product based on the carbonyl C═O position.

Example 2

Cyclopolymerizable Compound

A cyclopolymerizable compound having the following structure was prepared as described below.

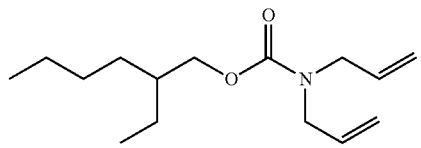 [SMILES: C=CCN(CC=C)C(=O)OCC(CC)CCCC]

To a 1 liter vessel with a large TEFLON® coated magnet are added 51.8 grams of 2-ethylhexyl chloroformate (MW 192.5) and 200 grams of tetrahydrofuran (THF). The vessel is then placed in a large crystallizing dish with ice/water/salt and stirring is begun to cool the mixture to about 0° C. To a different 400 mL beaker are added 28.0 grams of triethyl amine (TEA) (MW=101), 100 grams of THF, and 26.2 grams of diallylamine (DAA) (MW=97). This mixture is stirred with a stir rod until a homogeneous composition is obtained. The mixture of TEA/DAA/THF is slowly pipetted dropwise over about 1 hour to the cooled 2-ethylhexyl chloroformate/THF. A white precipitate forms almost instantly, sometimes violently reacting during the initial 50 mL addition of TEA/DAA/THF. If the contents of the reaction mixture in the 1 liter vessel get too thick for the magnet to stir, additional increments (of about 25 mL) of THF are added to thin the mixture and allow stirring to continue. If the contents still get too thick, the 1 liter vessel is manually stirred with a large glass stir rod until all the TEA/DAA/THF has been added. The reaction mixture is allowed to stir, coming to room temperature, overnight.

The next day, a 2 liter vacuum flask equipped with a 400 mL Buchner funnel are set up. A 110 mm Whatman 41 filter is added to the funnel and wetted with acetone and the contents of the 1 liter vessel (containing the product with the TEA-HCl salt in THF) is poured through the Buchner funnel, with vacuum on. The TEA-HCl salt is collected on the filter and the filtrate, containing the product in THF, is collected in the vacuum flask.

A 60 mL disposable syringe is fitted with a 1 μm glass microfilter, with a plug of glass wool added to the bottom, 0.5 inches of sand and about 35 mL of silica gel added. This is placed on a clean 2 L vacuum flask with adaptor. About 35 mL of acetone is added and allowed to wet the silica gel. The product mixture is then slowly added to the syringe and the vacuum introduced. The 1 liter of the product/salt/THF is quickly poured into syringe and filtered over the course of about 5 minutes. The filtrate, containing the product and THF/acetone, is then added to a 2 liter clean and dry beaker and allowed to evaporate, assisted by a gentle nitrogen flow overnight. The product is added to a pre-weighed jar and capped. In this manner, 65.8 g of product was obtained, resulting in a 96.4% yield. A Fourier transform infrared (FTIR) spectrum was obtained to qualitatively verify the product based on the carbonyl C═O position.

Example 3

Cyclopolymerizable Compound

A cyclopolymerizable compound having the following structure was prepared as described below.

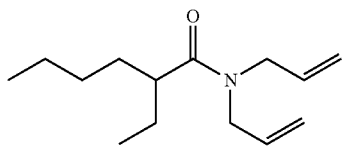 [SMILES: C=CCN(CC=C)C(=O)C(CC)CCCC]

To a 1 liter vessel with a large TEFLON® coated magnet are added 58.5 grams of 2-ethylhexoyl chloride (MW 163) and 150 grams of tetrahydrofuran (THF). The vessel is then placed in a large crystallizing dish with ice/water/salt and stirring is begun to cool the mixture to about 0° C. To a different 400 mL beaker are added 36.2 grams of triethyl amine (TEA) (MW=101), 100 grams of THF, and 34.8 grams of diallylamine (DAA) (MW=97). This mixture is stirred with a stir rod until a homogeneous composition is obtained. The mixture of TEA/DAA/THF is slowly pipetted dropwise over about 1 hour to the cooled 2-ethylhexoyl chloride/THF. A white precipitate forms almost instantly, sometimes violently reacting during the initial 50 mL addition of TEA/DAA/THF. If the contents of the reaction mixture in the 1 liter vessel get too thick for the magnet to stir, additional increments (of about 25 mL) of THF are added to thin the mixture and allow stirring to continue. If the contents still get too thick, the 1 liter vessel is manually stirred with a large glass stir rod until all the TEA/DAA/THF has been added. The reaction mixture is allowed to stir, coming to room temperature, overnight.

The next day, a 2 liter vacuum flask equipped with a 400 mL Buchner funnel are set up. A 110 mm Whatman 41 filter is added to the funnel and wetted with acetone and the contents of the 1 liter vessel (containing the product with the TEA-HCl salt in THF) is poured through the Buchner funnel, with vacuum on. The TEA-HCl salt is collected on the filter and the filtrate, containing the product in THF, is collected in the vacuum flask.

A 60 mL disposable syringe is fitted with a 1 μm glass microfilter, with a plug of glass wool added to the bottom, 0.5 inches of sand and about 35 mL of silica gel added. This is placed on a clean 2 L vacuum flask with adaptor. About 35 mL of acetone is added and allowed to wet the silica gel. The product mixture is then slowly added to the syringe and the vacuum introduced. The 1 liter of the product/salt/THF is quickly poured into syringe and filtered over the course of about 5 minutes. The filtrate, containing the product and THF/acetone, is then added to a 2 liter clean and dry beaker and allowed to evaporate, assisted by a gentle nitrogen flow overnight. The product is added to a pre-weighed jar and capped. In this manner, 77.0 g of product was obtained, resulting in a 96.3% yield. A Fourier transform infrared (FTIR) spectrum was obtained to qualitatively verify the product based on the carbonyl C=O position.

Example 4

Cyclopolymerizable Compound

A cyclopolymerizable compound having the following structure was prepared as described below.

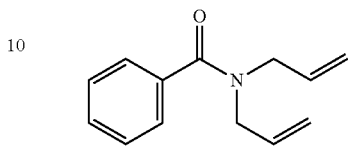

To a 1 liter vessel with a large TEFLON® coated magnet are added 35.1 grams of benzoyl chloride (MW 140.5) and 150 grams of tetrahydrofuran (THF). The vessel is then placed in a large crystallizing dish with ice/water/salt and stirring is begun to cool the mixture to about 0° C. To a different 400 mL beaker are added 26 grams of triethyl amine (TEA) (MW=101), 100 grams of THF, and 24.2 grams of diallylamine (DAA) (MW=97). This mixture is stirred with a stir rod until a homogeneous composition is obtained. The mixture of TEA/DAA/THF is slowly pipetted dropwise over about 1 hour to the cooled benzoyl chloride/THF. A white precipitate forms almost instantly, sometimes violently reacting during the initial 50 mL addition of TEA/DAA/THF. If the contents of the reaction mixture in the 1 liter vessel get too thick for the magnet to stir, additional increments (of about 25 mL) of THF are added to thin the mixture and allow stirring to continue. If the contents still get too thick, the 1 liter vessel is manually stirred with a large glass stir rod until all the TEA/DAA/THF has been added. The reaction mixture is allowed to stir, coming to room temperature, overnight.

The next day, a 2 liter vacuum flask equipped with a 400 mL Buchner funnel are set up. A 110 mm Whatman 41 filter is added to the funnel and wetted with acetone and the contents of the 1 liter vessel (containing the product with the TEA-HCl salt in THF) is poured through the Buchner funnel, with vacuum on. The TEA-HCl salt is collected on the filter and the filtrate, containing the product in THF, is collected in the vacuum flask.

A 60 mL disposable syringe is fitted with a 1 μm glass microfilter, with a plug of glass wool added to the bottom, 0.5 inches of sand and about 35 mL of silica gel added. This is placed on a clean 2 L vacuum flask with adaptor. About 35 mL of acetone is added and allowed to wet the silica gel. The product mixture is then slowly added to the syringe and the vacuum introduced. The 1 liter of the product/salt/THF is quickly poured into syringe and filtered over the course of about 5 minutes. The filtrate, containing the product and THF/acetone, is then added to a 2 liter clean and dry beaker and allowed to evaporate, assisted by a gentle nitrogen flow overnight. The product is added to a pre-weighed jar and capped. In this manner, 49.6 g of product was obtained, resulting in a 98.8% yield. A Fourier transform infrared (FTIR) spectrum was obtained to qualitatively verify the product based on the carbonyl C=O position.

Example 5

Cyclopolymerizable Compound

A cyclopolymerizable compound having the following structure was prepared as described below.

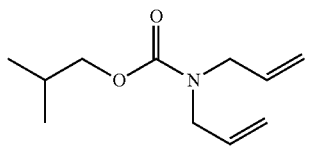

To a 1 liter vessel with a large TEFLON® coated magnet are added 102 grams of isobutyl chloroformate (MW 140.5) and 200 grams of tetrahydrofuran (THF). The vessel is then placed in a large crystallizing dish with ice/water/salt and stirring is begun to cool the mixture to about 0° C. To a different 400 mL beaker are added 76.0 grams of triethyl amine (TEA) (MW=101), 100 grams of THF, and 72.5 grams of diallylamine (DAA) (MW=97). This mixture is stirred with a stir rod until a homogeneous composition is obtained. The mixture of TEA/DAA/THF is slowly pipetted dropwise over about 1 hour to the cooled isobutyl chloroformate/THF. A white precipitate forms almost instantly, sometimes violently reacting during the initial 50 mL addition of TEA/DAA/THF. If the contents of the reaction mixture in the 1 liter vessel get too thick for the magnet to stir, additional increments (of about 25 mL) of THF are added to thin the mixture and allow stirring to continue. If the contents still get too thick, the 1 liter vessel is manually stirred with a large glass stir rod until all the TEA/DAA/THF has been added. The reaction mixture is allowed to stir, coming to room temperature, overnight.

The next day, a 2 liter vacuum flask equipped with a 400 mL Buchner funnel are set up. A 110 mm Whatman 41 filter is added to the funnel and wetted with acetone and the contents of the 1 liter vessel (containing the product with the TEA-HCl salt in THF) is poured through the Buchner funnel, with vacuum on. The TEA-HCl salt is collected on the filter and the filtrate, containing the product in THF, is collected in the vacuum flask.

A 60 mL disposable syringe is fitted with a 1 μm glass microfilter, with a plug of glass wool added to the bottom, 0.5 inches of sand and about 35 mL of silica gel added. This is placed on a clean 2 L vacuum flask with adaptor. About 35 mL of acetone is added and allowed to wet the silica gel. The product mixture is then slowly added to the syringe and the vacuum introduced. The 1 liter of the product/salt/THF is quickly poured into syringe and filtered over the course of about 5 minutes. The filtrate, containing the product and THF/acetone, is then added to a 2 liter clean and dry beaker and allowed to evaporate, assisted by a gentle nitrogen flow overnight. The product is added to a pre-weighed jar and capped. In this manner, 139.2 g of product was obtained, resulting in a 94.6% yield. A Fourier transform infrared (FTIR) spectrum was obtained to qualitatively verify the product based on the carbonyl C=O position.

Example 6

Cyclopolymerizable Compound

A cyclopolymerizable compound having the following structure was prepared as described below.

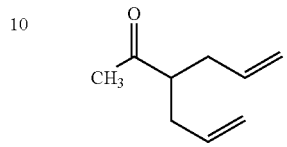

To a 1 liter vessel with a large TEFLON® coated magnet are added 52.6 grams of acetyl chloride (MW 78.5) and 300 grams of tetrahydrofuran (THF). The vessel is then placed in a large crystallizing dish with ice/water/salt and stirring is begun to cool the mixture to about 0° C. To a different 400 mL beaker are added 68 grams of triethyl amine (TEA) (MW=101), 100 grams of THF, and 65 grams of diallylamine (DAA) (MW=97). This mixture is stirred with a stir rod until a homogeneous composition is obtained. The mixture of TEA/DAA/THF is slowly pipetted dropwise over about 1 hour to the cooled acetyl chloride/THF. A white precipitate forms almost instantly, sometimes violently reacting during the initial 50 mL addition of TEA/DAA/THF. If the contents of the reaction mixture in the 1 liter vessel get too thick for the magnet to stir, additional increments (of about 25 mL) of THF are added to thin the mixture and allow stirring to continue. If the contents still get too thick, the 1 liter vessel is manually stirred with a large glass stir rod until all the TEA/DAA/THF has been added. The reaction mixture is allowed to stir, coming to room temperature, overnight.

The next day, a 2 liter vacuum flask equipped with a 400 mL Buchner funnel are set up. A 110 mm Whatman 41 filter is added to the funnel and wetted with acetone and the contents of the 1 liter vessel (containing the product with the TEA-HCl salt in THF) is poured through the Buchner funnel, with vacuum on. The TEA-HCl salt is collected on the filter and the filtrate, containing the product in THF, is collected in the vacuum flask.

A 60 mL disposable syringe is fitted with a 1 μm glass microfilter, with a plug of glass wool added to the bottom, 0.5 inches of sand and about 35 mL of silica gel added. This is placed on a clean 2 L vacuum flask with adaptor. About 35 mL of acetone is added and allowed to wet the silica gel. The product mixture is then slowly added to the syringe and the vacuum introduced. The 1 liter of the product/salt/THF is quickly poured into syringe and filtered over the course of about 5 minutes. The filtrate, containing the product and THF/acetone, is then added to a 2 liter clean and dry beaker and allowed to evaporate, assisted by a gentle nitrogen flow overnight. The product is added to a pre-weighed jar and capped. In this manner, 83.7 g of product was obtained, resulting in a 83.7% yield. A Fourier transform infrared (FTIR) spectrum was obtained to qualitatively verify the product based on the carbonyl C=O position.

Example 7

Cyclopolymerizable Compound

A cyclopolymerizable compound having the following structure was prepared as described below.

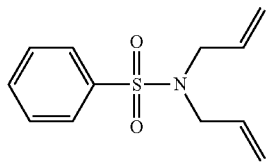 [SMILES: C=CCN(CC=C)S(=O)(=O)c1ccccc1]

To a 1 liter vessel with a large TEFLON® coated magnet are added 52.6 grams of benzene sulfonylchloride (MW 176.5) and 200 grams of tetrahydrofuran (THF). The vessel is then placed in a large crystallizing dish with ice/water/salt and stirring is begun to cool the mixture to about 0° C. To a different 400 mL beaker are added 51 grams of triethyl amine (TEA) (MW=101), 100 grams of THF, and 48.5 grams of diallylamine (DAA) (MW=97). This mixture is stirred with a stir rod until a homogeneous composition is obtained. The mixture of TEA/DAA/THF is slowly pipetted dropwise over about 1 hour to the cooled benzene sulfonylchloride/THF. A white precipitate forms almost instantly, sometimes violently reacting during the initial 50 mL addition of TEA/DAA/THF. If the contents of the reaction mixture in the 1 liter vessel get too thick for the magnet to stir, additional increments (of about 25 mL) of THF are added to thin the mixture and allow stirring to continue. If the contents still get too thick, the 1 liter vessel is manually stirred with a large glass stir rod until all the TEA/DAA/THF has been added. The reaction mixture is allowed to stir, coming to room temperature, overnight.

The next day, a 2 liter vacuum flask equipped with a 400 mL Buchner funnel are set up. A 110 mm Whatman 41 filter is added to the funnel and wetted with acetone and the contents of the 1 liter vessel (containing the product with the TEA-HCl salt in THF) is poured through the Buchner funnel, with vacuum on. The TEA-HCl salt is collected on the filter and the filtrate, containing the product in THF, is collected in the vacuum flask.

A 60 mL disposable syringe is fitted with a 1 μm glass microfilter, with a plug of glass wool added to the bottom, 0.5 inches of sand and about 35 mL of silica gel added. This is placed on a clean 2 L vacuum flask with adaptor. About 35 mL of acetone is added and allowed to wet the silica gel. The product mixture is then slowly added to the syringe and the vacuum introduced. The 1 liter of the product/salt/THF is quickly poured into syringe and filtered over the course of about 5 minutes. The filtrate, containing the product and THF/acetone, is then added to a 2 liter clean and dry beaker and allowed to evaporate, assisted by a gentle nitrogen flow overnight. The product is added to a pre-weighed jar and capped. In this manner, 108 g of product was obtained, resulting in a 91.1% yield. A Fourier transform infrared (FTIR) spectrum was obtained to qualitatively verify the product based on the carbonyl C=O position.

Example 8

Cyclopolymerizable Compound

A cyclopolymerizable compound having the following structure was prepared as described below.

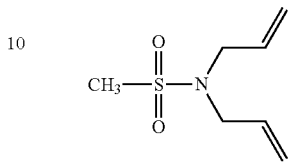

To a 1 liter vessel with a large TEFLON® coated magnet are added 134.4 grams of methane sulfonylchloride (MW 114.5) and 200 grams of tetrahydrofuran (THF). The vessel is then placed in a large crystallizing dish with ice/water/salt and stirring is begun to cool the mixture to about 0° C. To a different 400 mL beaker are added 120 grams of triethyl amine (TEA) (MW=101), 100 grams of THF, and 113.9 grams of diallylamine (DAA) (MW=97). This mixture is stirred with a stir rod until a homogeneous composition is obtained. The mixture of TEA/DAA/THF is slowly pipetted dropwise over about 1 hour to the cooled methane sulfonylchloride/THF. A white precipitate forms almost instantly, sometimes violently reacting during the initial 50 mL addition of TEA/DAA/THF. If the contents of the reaction mixture in the 1 liter vessel get too thick for the magnet to stir, additional increments (of about 25 mL) of THF are added to thin the mixture and allow stirring to continue. If the contents still get too thick, the 1 liter vessel is manually stirred with a large glass stir rod until all the TEA/DAA/THF has been added. The reaction mixture is allowed to stir, coming to room temperature, overnight.

The next day, a 2 liter vacuum flask equipped with a 400 mL Buchner funnel are set up. A 110 mm Whatman 41 filter is added to the funnel and wetted with acetone and the contents of the 1 liter vessel (containing the product with the TEA-HCl salt in THF) is poured through the Buchner funnel, with vacuum on. The TEA-HCl salt is collected on the filter and the filtrate, containing the product in THF, is collected in the vacuum flask.

A 60 mL disposable syringe is fitted with a 1 μm glass microfilter, with a plug of glass wool added to the bottom, 0.5 inches of sand and about 35 mL of silica gel added. This is placed on a clean 2 L vacuum flask with adaptor. About 35 mL of acetone is added and allowed to wet the silica gel. The product mixture is then slowly added to the syringe and the vacuum introduced. The 1 liter of the product/salt/THF is quickly poured into syringe and filtered over the course of about 5 minutes. The filtrate, containing the product and THF/acetone, is then added to a 2 liter clean and dry beaker and allowed to evaporate, assisted by a gentle nitrogen flow overnight. The product is added to a pre-weighed jar and capped. In this manner, 204 g of product was obtained, resulting in a 95.3% yield. A Fourier transform infrared (FTIR) spectrum was obtained to qualitatively verify the product based on the carbonyl C=O position.

Example 9

Cyclopolymerizable Compound

A cyclopolymerizable compound having the following structure was prepared as described below.

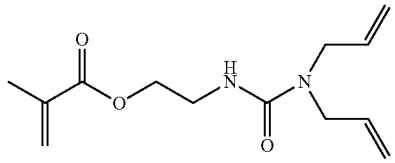 [SMILES: C=CCN(CC=C)C(=O)NCCOC(=O)C(=C)C]

To a 1 liter vessel with a large TEFLON® coated magnet is added 155 grams of isocyanatoethylmethacrylate (IEM) (MW 155). The vessel is then placed in a large crystallizing dish with ice/water, and stirring is begun to cool the mixture to about 0° C. About 97 grams of diallylamine (DAA) (MW=97) is added dropwise over about 1 hour to the cooled IEM. The reaction mixture is allowed to stir, coming to room temperature, overnight. The next day an IR was taken of the reaction product to verify that no excess isocyanate remained (by the lack of a peak at ~2230 cm$^{-1}$). Dry air is bubbled subsurface overnight to ensure no excess diallylamine exists in the reaction product.

Example 10

Cyclopolymerizable Compound

A cyclopolymerizable compound having the following structure was prepared as described below.

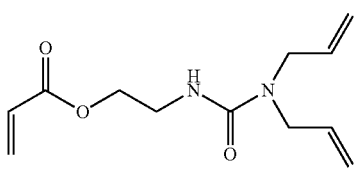 [SMILES: C=CCN(CC=C)C(=O)NCCOC(=O)C=C]

To a 1 liter vessel with a large TEFLON® coated magnet is added 143 grams of isocyanatoethylacrylate (IEA) (MW 143). The vessel is then placed in a large crystallizing dish with ice/water, and stirring is begun to cool the mixture to about 0° C. About 97 grams of diallylamine (DAA) (MW=97) is added dropwise over about 1 hour to the cooled IEA. The reaction mixture is allowed to stir, coming to room temperature, overnight. The next day an IR was taken of the reaction product to verify that no excess isocyanate remained (by the lack of a peak at ~2230 cm$^{-1}$). Dry air is bubbled subsurface overnight to ensure no excess diallylamine exists in the reaction product.

Example 11

Cyclopolymerizable Compound

A cyclopolymerizable compound having the following structure was prepared as described below.

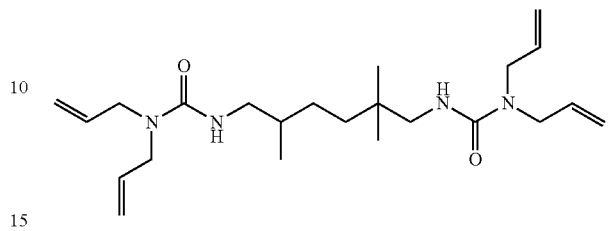

To a 1 liter vessel with a large TEFLON® coated magnet is added 50 grams of trimethyhexamethylenediisocyante (TMHDI) (MW 210). The vessel is then placed in a large crystallizing dish with ice/water, and stirring is begun to cool the mixture to about 0° C. About 46 grams of diallylamine (DAA) (MW=97) is added dropwise over about 1 hour to the cooled TMHDI. The reaction mixture is allowed to stir, coming to room temperature, overnight. The next day an IR was taken of the reaction product to verify that no excess isocyanate remained (by the lack of a peak at ~2230 cm$^{-1}$). Dry air is bubbled subsurface overnight to ensure no excess diallylamine exists in the reaction product.

Example 12

Cyclopolymerizable Compound

A cyclopolymerizable compound having the following structure was prepared as described below.

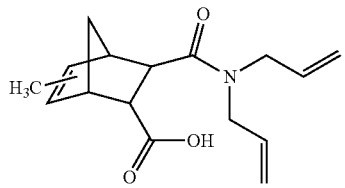

To a 1 liter vessel with a large TEFLON® coated magnet is added 20.0 grams of nadic anhydride (MW 178). The vessel is then placed in a large crystallizing dish with ice/water, and stirring is begun to cool the mixture to about 0° C. About 10.8 grams of diallylamine (DAA) (MW=97) is added dropwise over about 1 hour to the cooled nadic anhydride. The reaction mixture is allowed to stir, coming to room temperature, overnight. Dry air is bubbled subsurface to the reaction product (a viscous liquid) overnight to ensure no excess diallylamine exists in the reaction product.

Example 13

Cyclopolymerizable Compound

A cyclopolymerizable compound having the following structure was prepared as described below.

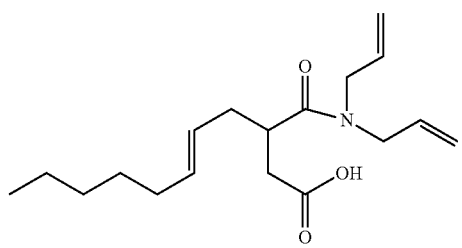 [SMILES: C=CCN(CC=C)C(=O)C(C/C=C/CCCCC)CC(=O)O]

To a 1 liter vessel with a large TEFLON® coated magnet is added 40.0 grams of octenylsuccinic anhydride (OSA) (MW 210). The vessel is then placed in a large crystallizing dish with ice/water, and stirring is begun to cool the mixture to about 0° C. About 18.5 grams of diallylamine (DAA) (MW=97) is added dropwise over about 1 hour to the cooled OSA. The reaction mixture is allowed to stir, coming to room temperature, overnight. Dry air is bubbled subsurface to the reaction product (a viscous liquid) overnight to ensure no excess diallylamine exists in the reaction product.

Example 14

Cyclopolymerizable Compound

A cyclopolymerizable compound having the following structure was prepared as described below.

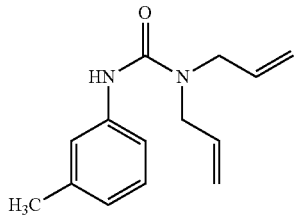 [SMILES: C=CCN(CC=C)C(=O)Nc1cccc(C)c1]

To a 1 liter vessel with a large TEFLON® coated magnet is added 53.5 grams of m-tolyl isocyanate (MW 232). The vessel is then placed in a large crystallizing dish with ice/water, and stirring is begun to cool the mixture to about 0° C. About 39 grams of diallylamine (DAA) (MW=97) is added dropwise over about 1 hour to the cooled m-tolyl isocyanate. The reaction mixture is allowed to stir, coming to room temperature, overnight. The next day an IR was taken of the reaction product to verify that no excess isocyanate remained (by the lack of a peak at ~2230 cm$^{-1}$). Dry air is bubbled subsurface overnight to ensure no excess diallylamine exists in the reaction product.

Example 15

Cyclopolymerizable Compound

A cyclopolymerizable compound having the following structure was prepared as described below.

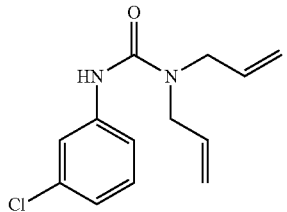 [SMILES: C=CCN(CC=C)C(=O)Nc1cccc(Cl)c1]

To a 1 liter vessel with a large TEFLON® coated magnet is added 202.5 grams of 3-chlorophenylisocyanate (MW 153.5). The vessel is then placed in a large crystallizing dish with ice/water, and stirring is begun to cool the mixture to about 0° C. About 128 grams of diallylamine (DAA) (MW=97) is added dropwise over about 1 hour to the cooled 3-chlorophenylisocyanate. The reaction mixture is allowed to stir, coming to room temperature, overnight. The next day an IR was taken of the reaction product to verify that no excess isocyanate remained (by the lack of a peak at ~2230 cm$^{-1}$). Dry air is bubbled subsurface overnight to ensure no excess diallylamine exists in the reaction product.

Example 16

Cyclopolymerizable Compound

A cyclopolymerizable compound having the following structure was prepared as described below.

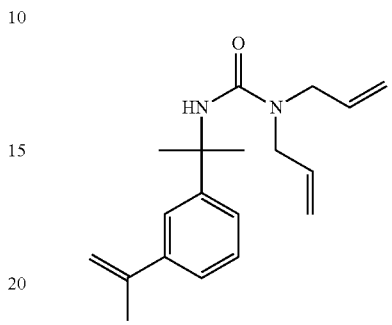

To a 1 liter vessel with a large TEFLON® coated magnet is added 100.5 grams of isoprenyl dimethylbenzylisocyanate (TMI-meta) (MW 201). The vessel is then placed in a large crystallizing dish with ice/water, and stirring is begun to cool the mixture to about 0° C. About 48.5 grams of diallylamine (DAA) (MW=97) is added dropwise over about 1 hour to the cooled TMI-meta. The reaction mixture is allowed to stir, coming to room temperature, overnight. The next day an IR was taken of the reaction product to verify that no excess isocyanate remained (by the lack of a peak at ~2230 cm$^{-1}$). Dry air is bubbled subsurface overnight to ensure no excess diallylamine exists in the reaction product.

Example 17

Cyclopolymerizable Compound

Figure 3:
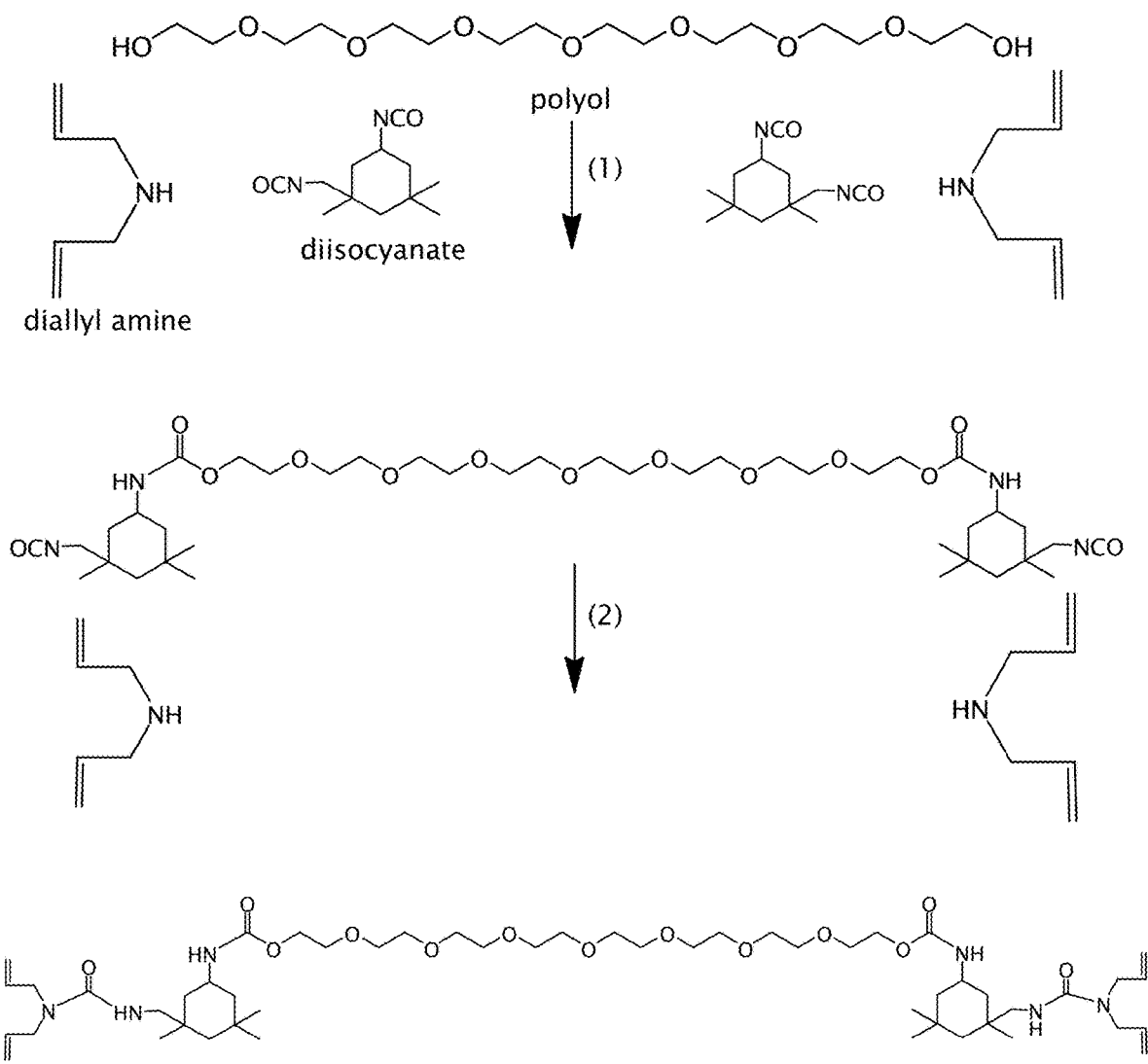
FIG. 3 illustrates a synthetic scheme for making a cyclopolymerizable compound or monomer according to one embodiment described herein.

A cyclopolymerizable compound having the structure of Formula (II) is prepared according to the reaction scheme illustrated in FIG. 3. With reference to FIG. 3, diallylamine and a diisocyanate (2 equivalents each) are reacted with a polyol (of the poly(ethylene glycol) type) (1 equivalent) in two steps. In Step (1), the polyol reacts with the diisocyanate to form a poly(ethylene glycol) "capped" with isocyanate moieties or functional groups at both ends. This species then reacts, in Step (2), with diallylamine to form the final product having the structure of Formula (II). In this manner, a "dimer" of cyclopolymerizable monomers is formed.

As described above, it is to be understood that other cyclopolymerizable monomers can be formed in an analogous manner, as understood by one of ordinary skill in the art.

Example 18

Method of Preparing Inks

Inks according to some embodiments described herein were prepared as follows. Specifically, to prepare a particular ink, the components of the particular ink were mixed in a reaction vessel, as shown in the Tables below. The amounts of the various components in the Tables below refer to the wt. % of each component of the identified ink, based on the total weight of the ink. For each ink, the appropriate mixture was heated to a temperature of about 75° C. -85° C. with stirring. The heating and stirring were continued until the mixture attained a substantially homogenized molten state. The molten mixture was then filtered. Next, the filtered mixture was allowed to cool to ambient temperature.

Example 19

Cyclopolymerizable Monomer Variants

Inks 1-6 in Table I below were prepared according to the procedure in Example 18. Inks 1-6 were prepared using different types of cyclopolymerizable monomer. The cyclopolymerizable monomer for Ink I was the monomer of Example 1 above. For Ink 2, the cyclopolymerizable monomer was the monomer of Example 9 above. For Ink 3, the cyclopolymerizable monomer was the monomer of Example 7 above. For Ink 4, the cyclopolymerizable monomer was the monomer of Example 15 above. For Ink 5, the cyclopolymerizable monomer was the monomer of Example 6. For Ink 6, the cyclopolymerizable monomer was the monomer of Example 8. Selected properties of Inks 1-6, after curing, are provided in Table II.

In Table II, impact strength was measured according to ASTM D256. Tensile strength was measured according to ASTM D638. Percent elongation was measured according to ASTM D638. Glass transition temperature (Tg) was measured by dynamic mechanical analysis (DMA) using the Tan Delta Peak, according to ASTM E1640. Heat distortion (or deflection) temperature (HDT) was measured using DMA at 0.455 MPa according to ASTM D648. Curing of the inks was carried out by casting the specific ink formulation into the proper shape/dimensions mold for the respective ASTM testing protocol. The inks were then cured with three Phoseon FE300 LEDs (395 nm×5 W/cm$^2$) with a 2.5 cm pitch. Curing was undertaken for 6 minutes. The molds were then placed into a DYMAX 5000 Hg cure oven for post-cure. The samples were post-cured for 30 minutes on each side and then removed from the mold and submitted for thermo-mechanical testing.

As shown in Table II, various cyclopolymerizable monomers could be used to obtain a desirable combination of properties, particularly a desired combination of elongation and impact strength. It is to be especially noted that Inks 3 and 6 differed only in the identity of the cyclopolymerizable monomer (for each ink, the oligomeric curable material was the same 4.5:1 combination (by weight) of hydrophobic urethane acrylate and multifunctional acrylate oligomer; the non-curable polymer/oligomer was the same carboxyl-terminated butadiene and butadiene-acrylonitrile copolymer (CTBN); and the photoinitiator was the same 6:1 combination of Lucirin TPO and Speedcure 84).

TABLE I

Ink Compositions (amounts in wt. %).

| | Ink 1 | Ink 2 | Ink 3 | Ink 4 | Ink 5 | Ink 6 |
|---|---|---|---|---|---|---|
| Cyclopolymerizable Monomer | 31.86 | 47.99 | 31.57 | 47.92 | 31.8 | 31.8 |
| Additional Monomeric Curable Material | 0 | 47.87 | 0 | 0 | 0 | 0 |
| Oligomeric Curable Material | 57.71 | 0 | 58.69 | 47.92 | 58.1 | 58.2 |
| Photoinitiator | 3.47 | 4.14 | 3.43 | 4.16 | 3.5 | 3.5 |
| Colorant | 0 | 0 | 0 | 0 | 0 | 0 |
| Non-Curable Polymer/Oligomer | 6.96 | 0 | 6.31 | 0 | 6.6 | 6.5 |

TABLE II

Ink Properties.

| | Ink 3 | Ink 5 | Ink 6 |
|---|---|---|---|
| Impact Strength (J/m) | 67.5 | 112.6 | 56.6 |
| Tensile Strength (MPa) | 27.32 | 15.61 | 23.38 |
| % Elongation | 48.99 | 42.07 | 44.41 |
| Tg (° C.) | 74.2 | — | 71.7 |
| HDT (° C.) | 47.70 | — | 42.26 |

Example 20

Additional Example Inks

Additional inks according to the present disclosure were also prepared, using various components. Specifically, Inks 7-13 in Table III below were prepared according to the procedure in Example 18, using the components identified in Tables IV and V. In Tables IV and V, the cyclopolymerizable monomer for each ink is identified with reference to the specific Examples ("Ex.") above. Also, for each of Inks 7-13, the photoinitiator was an approximate 6:1 to 7:1 combination (by weight) of Lucirin TPO and Speedcure 84.

TABLE III

Ink Compositions (amounts in wt. %).

| | Ink 7 | Ink 8 | Ink 9 | Ink 10 | Ink 11 | Ink 12 | Ink 13 |
|---|---|---|---|---|---|---|---|
| Cyclopolymerizable Monomer | 47.95 | 47.86 | 55.83 | 55.19 | 55.73 | 56.7 | 30.0 |
| Additional Monomeric Curable Material | 48.07 | 48.15 | 0 | 0 | 0 | 0 | 0 |
| Oligomeric Curable Material | 0 | 0 | 40.03 | 40.71 | 40.13 | 39.2 | 65.85 |
| Photoinitiator | 3.98 | 3.99 | 4.14 | 4.1 | 4.14 | 4.1 | 4.15 |
| Colorant | 0 | 0 | 0 | 0 | 0 | 0 | 0 |
| Non-Curable Polymer/Oligomer | 0 | 0 | 0 | 0 | 0 | 0 | 0 |

TABLE IV

Ink Components.

| | Ink 7 | Ink 8 | Ink 13 |
|---|---|---|---|
| Cyclopolymerizable Monomer | Ex. 7 | Ex. 8 | Ex. 11 |
| Additional Monomeric Curable Material | IBOA | IBOA | — |
| Oligomeric Curable Material | — | — | 30:36 ratio (by weight) of polyester urethane acrylte and ethoxylated (10) bisphenol A diacrylate |

TABLE V

Ink Components.

| | Ink 9 | Ink 10 | Ink 11 | Ink 12 |
|---|---|---|---|---|
| Cyclopolymerizable Monomer | Ex. 1 | Ex. 2 | Ex. 3 | Ex. 4 |
| Oligomeric Curable | aliphatic polyether | aliphatic polyether | aliphatic polyether | aliphatic polyether |

TABLE V-continued

| | Ink Components. | | | |
|---|---|---|---|---|
| Material | Ink 9 | Ink 10 | Ink 11 | Ink 12 |
| | urethane acrylate | urethane acrylate | urethane acrylate | urethane acrylate |

Example 21

Comparative Data

Inks 3, 5, and 6 above were compared to Comparative ("Comp.") Inks 1 and 2 in Table VI below. All inks in Table VI were prepared according to the procedure in Example 18. Unlike Inks 3, 5, and 6, each of Comparative Inks 1 and 2 lacks a cyclopolymerizable monomer within the range of amounts described herein. Instead, the Comparative Inks include a different, non-cyclopolymerizable monomer. Comparative Ink 1 includes IBOA instead of a cyclopolymerizable monomer. Comparative Ink 2 includes 2-phenoxyethyl acrylate instead of a cyclopolymerizable monomer. Comparative Inks 1 and 2 otherwise include similar amounts of the same additional components as Inks 3, 5, and 6 (e.g., the oligomeric curable material, photoinitiator, and non-curable polymer/oligomer are the same chemical species in substantially the same amounts in all of the inks in Table VI). As shown in Table VI, Inks 3, 5, and 6 exhibited a combination of relatively high impact strength and relatively high elongation at break (within ranges described hereinabove), as compared to Comparative Ink 1 and Comparative Ink 2.

TABLE VI

| | Ink Compositions (amounts in wt. %). | | | | |
|---|---|---|---|---|---|
| | Ink 3 | Ink 5 | Ink 6 | Comp. Ink 1 | Comp. Ink 2 |
| Cyclopolymerizable Monomer | Ex. 7 | Ex. 6 | Ex. 8 | — | — |
| Cyclopolymerizable Monomer Amount | 31.57 | 31.8 | 31.8 | 0 | 0 |
| Additional Monomeric Curable Material | 0 | 0 | 0 | 32.02 | 31.96 |
| Oligomeric Curable Material | 58.69 | 58.1 | 58.2 | 57.58 | 57.69 |
| Photoinitiator | 3.43 | 3.5 | 3.5 | 3.5 | 3.49 |
| Colorant | 0 | 0 | 0 | 0 | 0 |
| Non-Curable Polymer/Oligomer | 6.31 | 6.6 | 6.5 | 6.9 | 6.86 |
| Impact Strength (MPa) | 67.50 | 112.60 | 56.60 | 31.4 | 54.5 |
| Elongation at Break (%) | 48.99 | 42.07 | 44.41 | 15.76 | 31.74 |

Example 22

Additional Exemplary Ink Compositions

In addition to Inks 1-13 above, other inks according to the present disclosure are provided using the amounts in Table VII below. The amounts in Table VII refer to the wt. % of each component of the identified ink, based on the total weight of the ink. Additionally, "PI" stands for "photoinitiator."

TABLE VII

| Ink Components (amounts in wt. %). | | | | | |
|---|---|---|---|---|---|
| Cyclopolymerizable Monomer | Additional Monomeric Curable Material | Oligomeric Curable Material | Stabilizer/Inhibitor | Colorant | PI |
| 10-70 | 0-70 | 10-70 | 0.01-1 | 0-2 | 0-5 |
| 10-60 | 10-60 | 10-60 | 0.1-2 | 0.1-2 | 0-5 |
| 20-70 | 0-60 | 20-70 | 0.01-2 | 0.1-1 | 0-5 |
| 20-70 | 20-70 | 0-50 | 0.01-2 | 0-2 | 0.5-5 |
| 20-60 | 0-40 | 20-70 | 0.01-0.2 | 0-0.5 | 1-5 |
| 20-50 | 0-40 | 30-70 | 0.01-0.1 | 0.1-1.5 | 1-5 |
| 20-50 | 10-40 | 30-70 | 0.01-0.5 | 0-2 | 1-5 |
| 20-40 | 0-40 | 30-65 | 0.01-1 | 0-1.5 | 1-5 |
| 20-40 | 10-40 | 30-65 | 0.05-1.5 | 0.01-1 | 1-5 |
| 30-40 | 0-40 | 30-65 | 0.01-2 | 0-0.5 | 1-5 |
| 30-40 | 10-40 | 30-65 | 0.01-0.2 | 0.5-1.5 | 1-5 |

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. An ink for use in a three-dimensional printing system comprising:
   10-70 wt. % cyclopolymerizable monomer, based on the total weight of the ink,
   wherein the cyclopolymerizable monomer comprises a first ethenyl or ethynyl moiety and a second ethenyl or ethynyl moiety, and
   wherein the α-carbon of the first ethenyl or ethynyl moiety and the α-carbon of the second ethenyl or ethynyl moiety have a 1,5-, 1,6-, 1,7-, or 1,8-relationship, and wherein the cyclopolymerizable monomer has the structure of Formula (I):

wherein:
$R_1$ is a hydrocarbon group having 1-4 carbon atoms;
$R_2$ is a hydrocarbon group having 1-4 carbon atoms;
the total number of carbon atoms of $R_1$ and $R_2$ does not exceed 5;
$R_3$ is HC=$CH_2$ or C≡CH;
$R_4$ is HC=$CH_2$ or C≡CH;
$R_5$ is

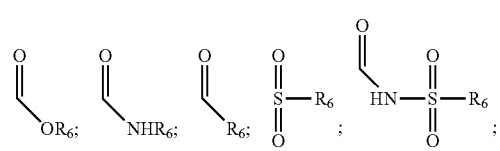

or a polymerizable moiety; and $R_6$ is a substituted or unsubstituted hydrocarbon group having 1-30 carbon atoms.

2. The ink of claim 1, wherein the cyclopolymerizable monomer is present in the ink in an amount of 20-40 wt. %, based on the total weight of the ink.

3. The ink of claim 1, wherein the α-carbon of the first ethenyl or ethynyl moiety and the α-carbon of the second ethenyl or ethynyl moiety have a 1,5-relationship.

4. The ink of claim 1, wherein the α-carbon of the first ethenyl or ethynyl moiety and the α-carbon of the second ethenyl or ethynyl moiety have a 1,6-relationship.

5. The ink of claim 1, wherein the α-carbon of the first ethenyl or ethynyl moiety and the α-carbon of the second ethenyl or ethynyl moiety have a 1,7-relationship.

6. The ink of claim 1, wherein the α-carbon of the first ethenyl or ethynyl moiety and the α-carbon of the second ethenyl or ethynyl moiety have a 1,8-relationship.

7. The ink of claim 1, wherein $R_5$ is selected from

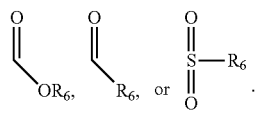

8. The ink of claim 1 further comprising:
10-60 wt. % oligomeric curable material; and
up to 80 wt. % additional monomeric curable material, based on the total weight of the ink.

9. The ink of claim 1 further comprising at least one photo initiator.

10. The ink of claim 1 further comprising at least one colorant and/or one or more additives selected from the group consisting of inhibitors and stabilizing agents.

11. The ink of claim 1, wherein the viscosity of the ink is 500 cP or less at 30° C.

12. A method of printing a three-dimensional article comprising:
selectively depositing layers of an ink in a fluid state onto a substrate to form the three-dimensional article,
wherein the ink comprises the ink of claim 1.

13. The method of claim 12 further comprising partially curing the ink prior to completion of deposition of all layers of the ink, wherein partially curing the ink primarily comprises (meth)acrylate polymerization.

14. The method of claim 13 further comprising post-curing the ink following completion of deposition of all layers of the ink,
wherein post-curing the ink primarily comprises cyclopolymerizing the cyclopolymerizable monomer.

* * * * *